(12) United States Patent
Akao et al.

(10) Patent No.: US 8,649,656 B2
(45) Date of Patent: Feb. 11, 2014

(54) IMAGE PROCESSING APPARATUS AND METHOD, AND PROGRAM

(75) Inventors: Masato Akao, Kanagawa (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 553 days.

(21) Appl. No.: 12/486,407

(22) Filed: Jun. 17, 2009

(65) Prior Publication Data

US 2009/0324200 A1    Dec. 31, 2009

(30) Foreign Application Priority Data

Jun. 25, 2008   (JP) .................................. 2008-166061

(51) Int. Cl.
*H04N 5/92* (2006.01)
(52) U.S. Cl.
USPC .......................................... 386/239; 386/353
(58) Field of Classification Search
None
See application file for complete search history.

(56) References Cited

U.S. PATENT DOCUMENTS

| | | | |
|---|---|---|---|
| 2003/0103562 A1* | 6/2003 | Sugiyama | 375/240.01 |
| 2005/0210388 A1* | 9/2005 | Matsumoto | 715/719 |
| 2007/0201769 A1* | 8/2007 | Node et al. | 382/309 |
| 2007/0206917 A1* | 9/2007 | Ono et al. | 386/68 |

FOREIGN PATENT DOCUMENTS

JP    2007-235374    9/2007

* cited by examiner

*Primary Examiner* — Huy T Nguyen
*Assistant Examiner* — Eileen Adams
(74) *Attorney, Agent, or Firm* — Oblon, Spivak, McClelland, Maier & Neustadt, L.L.P.

(57) ABSTRACT

An image processing apparatus includes the following elements. A playback-position feature value extracting unit extracts, as a playback-position feature value, a feature value at a playback position from an image being played back. A synchronizing unit synchronizes the playback-position feature value with a feature value on a data recording medium on which setting information for processing the image is recorded in association with a feature value of the image. A control unit controls a time width used for synchronization between the feature value on the data recording medium with the playback-position feature value. A reading unit reads, when the playback-position feature value is synchronized with the feature value on the data recording medium, the setting information recorded on the data recording medium in association with the playback-position feature value. A reflecting unit reflects, based on the read setting information, the process in the image being played back.

8 Claims, 26 Drawing Sheets

FIG. 19

2-3 PULL-DOWN VIDEO

| N | 1 | 2 | 3 | 4 | 5 | 6 | 7 | 8 | 9 | 10 | 11 | 12 |
|---|---|---|---|---|---|---|---|---|---|----|----|----|
| FEATURE VALUE Δ | 18 | 18 | E0 | E0 | E0 | 93 | 93 | AC | AC | AC | 66 | 66 |
| n | 1 | 1 | 2 | 2 | 2 | 3 | 3 | 4 | 4 | 4 | 5 | 5 | b ↑ (column 10)

↓ $n > B_{base}(=4)$

| VIDEO TYPE NUMBER P | I-J CONVERSION | | NUMBER OF MATCHING FRAMES b |
|---|---|---|---|
| | I | J | |
| 1 | 2 | 2 | 8 |
| 2 | 2 | 3 | 10 |
| 3 | 5 | 5 | 20 |
| 4 | 7 | 8 | 30 |
| ... | ... | ... | ... |
| $P_{max}$ | - | - | 4 |

2-3 PULL-DOWN VIDEO

| N | 1 | 2 | 3 | 4 | 5 | 6 | 7 | 8 | 9 | 10 | 11 | 12 |
|---|---|---|---|---|---|---|---|---|---|----|----|----|
| FEATURE VALUE Δ | 18 | 18 | E0 | E0 | E0 | 93 | 93 | AC | AC | AC | 66 | 66 |
| i | 1 | 1 | 2 | 2 | 2 | 3 | 3 | 4 | 4 | 4 | 5 | 5 | b i > $B_{base}(=4)$

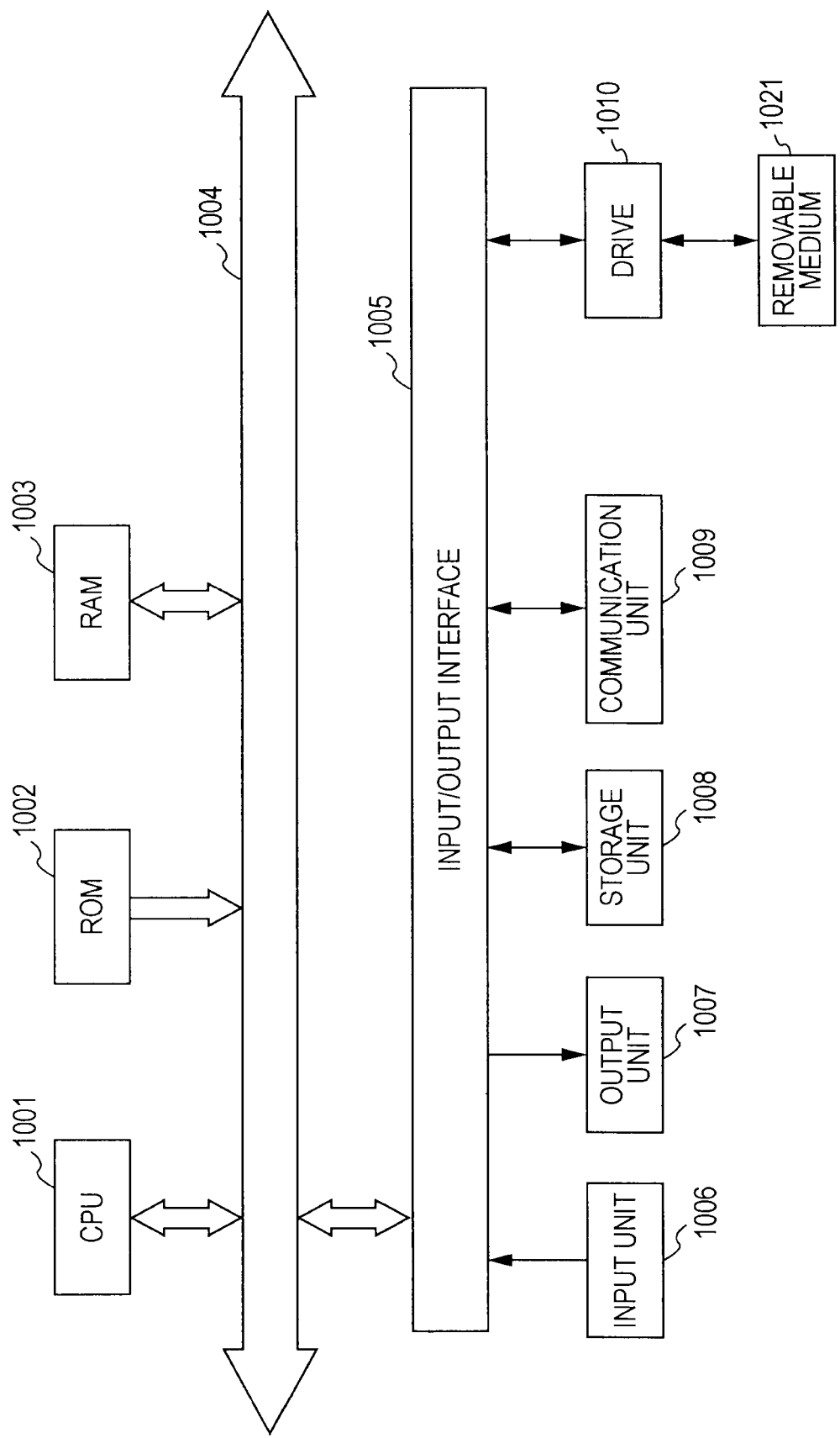

IMAGE PROCESSING APPARATUS AND METHOD, AND PROGRAM

BACKGROUND OF THE INVENTION

1. Field of the Invention

The present invention relates to an image processing apparatus and method, and a program. More specifically, the present invention relates to an image processing apparatus and method, and a program which ensure high identification performance based on image feature values regardless of the background of input images while minimizing the amount of calculation involved in synchronization detection which may increase as a side effect of improved identification performance.

2. Description of the Related Art

Systems have been available which are capable of performing synchronization detection (matching process) using image feature values extracted from input images and recording setting information for processing the images in association with the image feature values (see, for example, Japanese Unexamined Patent Application Publication No. 2007-235374).

SUMMARY OF THE INVENTION

However, such systems of the related art have a problem in that it is difficult to accurately determine a search position when a certain image such as a still image or a 2-2 or 2-3 pull-down image is input.

It is therefore desirable to ensure high identification performance based on image feature values regardless of the background of input images while minimizing the amount of calculation involved in synchronization detection which may increase as a side effect of improved identification performance.

In an embodiment of the present invention, an image processing apparatus includes the following elements. Playback-position feature value extracting means extracts a playback-position feature value from an image being played back, the playback-position feature value being a feature value at a playback position. Synchronizing means synchronizes the playback-position feature value with a feature value on a data recording medium on which setting information for processing the image is recorded in association with a feature value of the image. Control means controls a time width during which the synchronizing means performs synchronization between the feature value on the data recording medium with the playback-position feature value. Reading means reads, when the synchronizing means synchronizes the feature value on the data recording medium with the playback-position feature value under control of the control means, the setting information recorded on the data recording medium in association with the playback-position feature value. Reflecting means reflects, based on the setting information read by the reading means, the process in the image being played back.

The control means may determine the time width in accordance with a type of the image.

The control means may determine the time width using a density of information included in the image in a time direction.

There may be a plurality of types of images, and the control means may determine the time width using a table stored in advance in the image processing apparatus, the table including pieces of information each indicating, for one of the plurality of types of images, a time width during which a playback-position feature value is synchronized with a feature value on the data recording medium.

The control means may determine the time width using a difference between two adjacent unit images in the image.

In embodiments of the present invention, an image processing method and a program include steps corresponding to the structural elements of the image processing apparatus in the embodiment of the present invention described above.

In the image processing apparatus and method, and the program according to the embodiments of the present invention, a feature value at a playback position is extracted as a playback-position feature value from an image being played back; the playback-position feature value is synchronized with a feature value on a data recording medium on which setting information for processing the image is recorded in association with a feature value of the image; during the synchronization, a time width during which the feature value on the data recording medium is synchronized with the playback-position feature value is controlled; when the feature value on the data recording medium is synchronized with the playback-position feature value under controlling of the time width, the setting information recorded in association with the playback-position feature value is read from the data recording medium; and based on the read setting information, the process is reflected in the image being played back.

According to an embodiment of the present invention, therefore, high identification performance based on image feature values can be achieved regardless of the background of input images and the amount of calculation involved in synchronization detection which may increase as a side effect of improved identification performance, can be minimized.

BRIEF DESCRIPTION OF THE DRAWINGS

FIG. 19 is a diagram showing a process that is a part of the information-amount evaluation process shown in FIG. 18;

FIG. 26 is a block diagram showing an example hardware configuration of an information processing apparatus according to an embodiment of the present invention.

DESCRIPTION OF THE PREFERRED EMBODIMENTS

Embodiments of the present invention will be described hereinafter with reference to the drawings.

Figure 1:
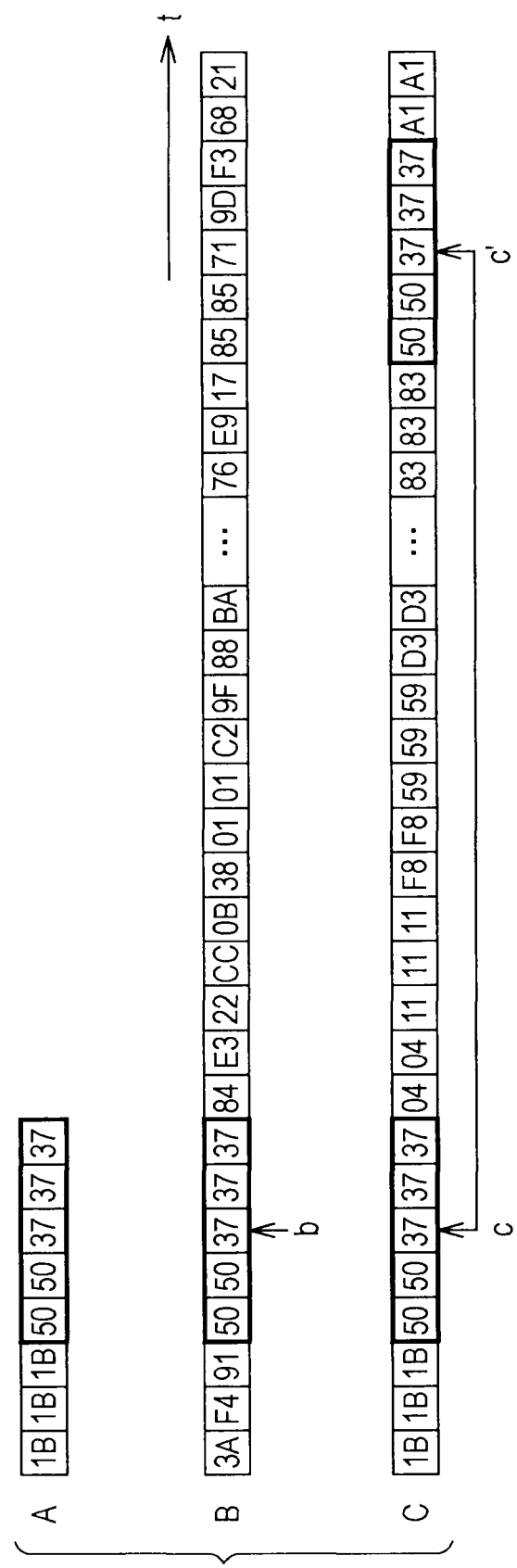
FIG. 1 is a diagram showing a problem with synchronization detection in the related art.

FIG. 1 is a diagram showing a problem with synchronization detection in the related art.

In FIG. 1, each rectangular block represents a frame. Numerals in the rectangular blocks denote image feature values for the frames. The same applies to other figures.

Part A of FIG. 1 shows image feature values (for example, playback-position feature values or the like, which will be described below) to be matched. Part B of FIG. 1 shows image feature values of a normal moving image. Part C of FIG. 1 shows image feature values of a 2-3 pull-down image with respect to the normal moving image. In FIG. 1, for simplicity of illustration, it is assumed that an image feature value per frame has a size "a" of, but not limited to, 1 byte. The same applies to other examples shown in FIG. 2 and following figures.

When the image feature values to be matched shown in part A of FIG. 1 are synchronized with the image feature values of the normal image shown in part B of FIG. 1, as shown in part B of FIG. 1, matching is found at one search position b. In contrast, when the image feature values to be matched shown in part A of FIG. 1 are synchronized with the image feature values of the 2-3 pull-down image shown in part C of FIG. 1, matching is found at a plurality of positions such as search positions c and c'. Thus, the problem described in the related art section, that is, the problem of not accurately determining a search position, occurs.

Figure 2:
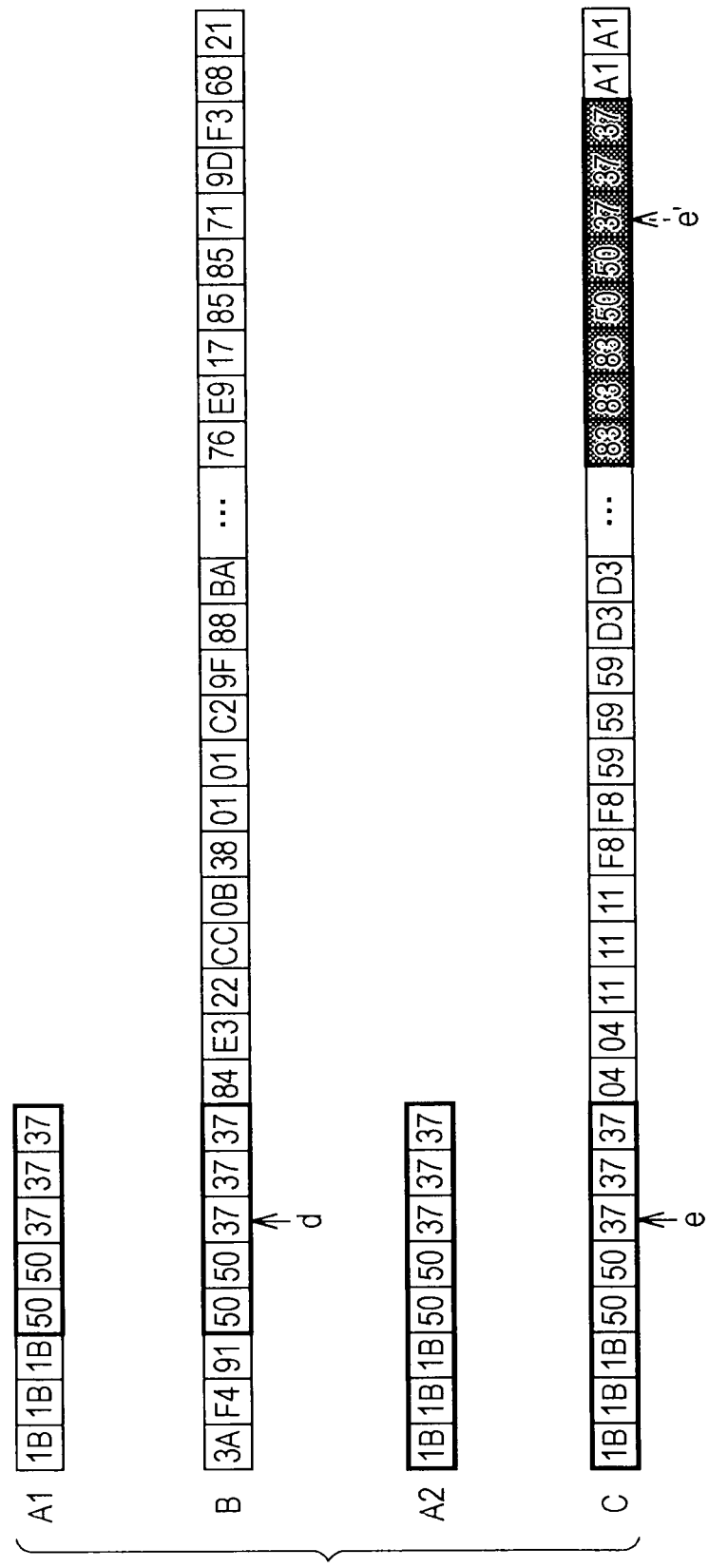
FIG. 2 is a diagram showing synchronization detection according to an embodiment of the present invention.

The present inventors have achieved a synchronization detection technique shown in, for example, FIG. 2 for overcoming the problem. FIG. 2 is a diagram showing an example of a synchronization detection technique according to an embodiment of the present invention.

Parts A1 and A2 of FIG. 2 show image feature values (such as playback-position feature values, which will be described below) to be matched, which are similar to part A of FIG. 1. The difference between the image feature values shown in parts A1 and A2 of FIG. 2 will be described below. Part B of FIG. 2 shows a normal moving image, which is similar to part B of FIG. 1. Part C of FIG. 2 shows a 2-3 pull-down image with respect to the normal moving image B, which is similar to part C of FIG. 1.

As in the related art, image feature values to be matched in the synchronization with the image feature values of the normal image shown in part B of FIG. 2 are the feature values for five frames shown in part A1 of FIG. 2. Therefore, as shown in part B of FIG. 2, matching is found at one search position d.

In contrast, image feature values to be matched in the synchronization with the image feature values of the 2-3 pull-down image shown in part C of FIG. 2 are, for example, the feature values for eight frames shown in part A2 of FIG. 2 instead of the feature values for five frames shown in part A1 of FIG. 2 which is similar to that in the related art. Then, matching is found at one search position e. No matching is found at a search position e', which is erroneously detected as a matching position in the related art.

The present inventors have achieved such a synchronization detection technique that a variable number of feature values (number of frames) to be matched are used in accordance with the image type (hereinafter referred to as a "variable-number-of-feature-values technique"). Here, it can be understood that the number of frames to be matched represents a time width. From this, it can further be understood that the variable-number-of-feature-values technique is also a synchronization detection technique in which the time width of an object to be matched can be controlled in accordance with the image type. With the use of this variable-number-of-feature-values technique, high frame identification performance for synchronization detection can be achieved regardless of whether the amount of information of an input signal is biased in the time direction.

In the following, first, a concept of an image processing apparatus according to an embodiment of the present invention, that is, an image processing apparatus that uses the variable-number-of-feature-values technique, will be described with reference to FIGS. 3 and 4. The image processing apparatus according to the embodiment of the present invention is configured to perform a process specified by a user on an image recorded in advance and to display a resulting image. In this process, the image processing apparatus extracts an image feature value and accumulates process information regarding the process in association with the image feature value. Further, during playback of the image recorded in advance, the image processing apparatus reads the accumulated process information, performs a process on the image, and displays a resulting image.

More specifically, the operation of an image processing apparatus 2 has broadly two modes, namely, a recording mode and a playback mode.

Figure 3:
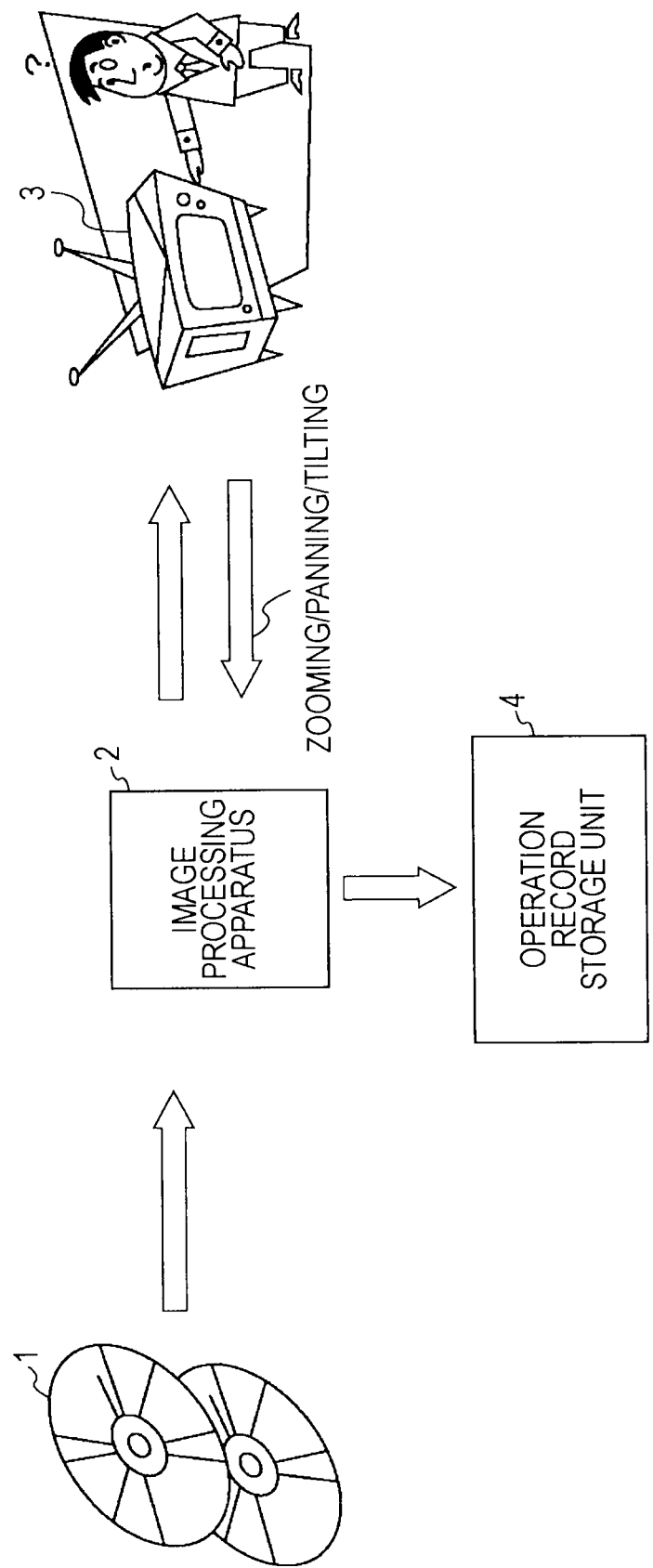
FIG. 3 is a diagram showing a concept of an image processing apparatus according to an embodiment of the present invention.

In the recording mode, as shown in FIG. 3, the image processing apparatus 2 displays on a display unit 3 an image played back from a recording medium 1 such as a digital versatile disc (DVD) using a DVD player or the like. The recording medium 1 has content including a moving image recorded thereon in advance. In a state where the image is displayed on the display unit 3, when a user or the like operates a remote controller or any other suitable device and enters an instruction for performing a desired process on the image, such as zooming, panning, or tilting, the image processing apparatus 2 generates setting information corresponding to the operation, performs the process specified by the setting information on the image, and displays a resulting image on the display unit 3. Further, the image processing apparatus 2 extracts an image feature value from the image, and accumulates the setting information in an operation record storage unit 4 in association with the extracted image feature value.

Figure 4:
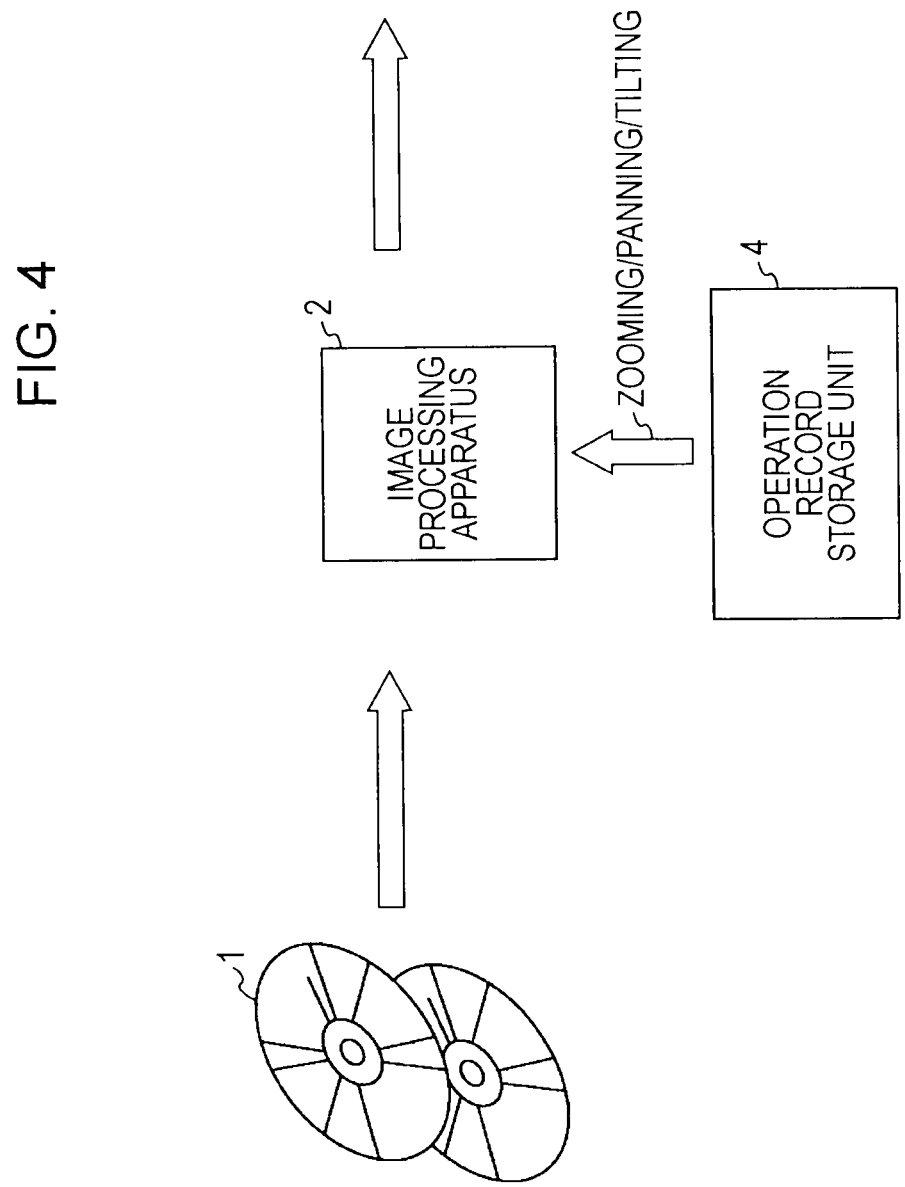
FIG. 4 is a diagram showing a concept of an image processing apparatus according to an embodiment of the present invention.

Next, in the playback mode, as shown in FIG. 4, the image processing apparatus 2 reads an image to be played back using a DVD player or the like from a recording medium 1 on which content including a moving image is recorded in advance, and also extracts an image feature value. In this process, in synchronization with the image feature value read from the recording medium 1, the image processing apparatus 2 reads the setting information recorded in the operation record storage unit 4 in association with the feature value. In addition, the image processing apparatus 2 performs the process on the image based on the read setting information, and displays a resulting image on the display unit 3.

With the operation described above, the image processing apparatus 2 accumulates only a process to be performed on an image recorded in advance, and can repeatedly play back an image obtained as a processing result without recording the image obtained as a processing result. Consequently, a pre-recorded copy-controlled image that can be copied a limited number of times, such as a copy-once image, can be repeatedly subjected to modification processes such as various image processes.

The image processing apparatus 2 described with reference to FIGS. 3 and 4 will now be described in detail.

Figure 5:
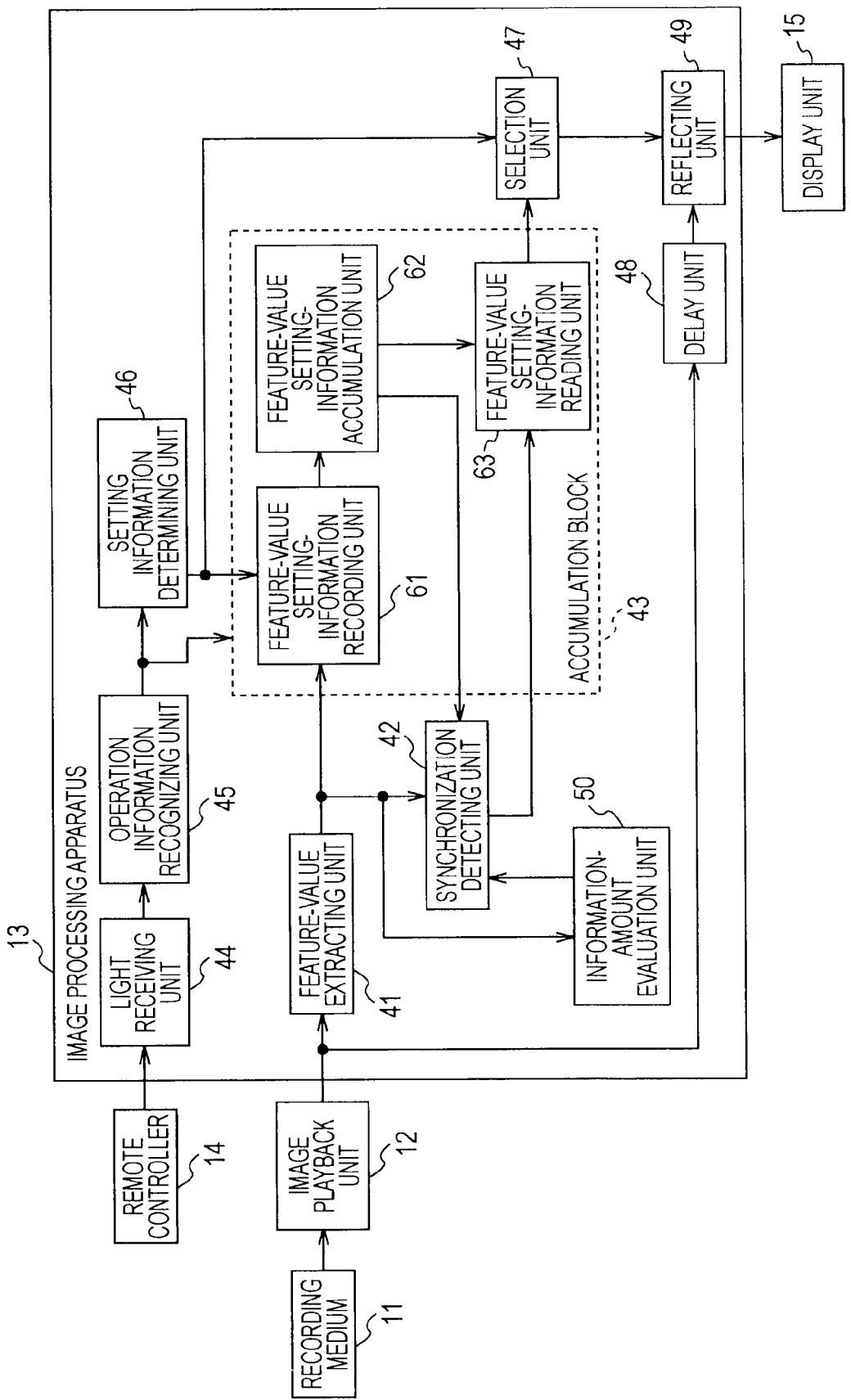
FIG. 5 is a block diagram showing a structure of an image processing apparatus according to an embodiment of the present invention.

FIG. 5 is a diagram showing a structure of an image processing apparatus 13 according to an embodiment of the present invention which corresponds to the image processing apparatus 2 shown in FIGS. 3 and 4.

An image playback unit 12 decodes an image encoded using a predetermined format and recorded on a recording medium 11. The recording medium 11 corresponds to the recording medium 1 shown in FIGS. 3 and 4. Then, the image playback unit 12 sequentially supplies the decoded image to a feature-value extracting unit 41 and a delay unit 48.

The feature-value extracting unit 41 extracts an image feature value (hereinafter referred to as a "feature value", as desired) sequentially supplied from the image playback unit 12, and supplies the extracted feature value to a synchronization detecting unit 42, an information-amount evaluation unit 50, and a feature-value setting-information recording unit 61 in an accumulation block 43. For example, the feature-value extracting unit 41 extracts, as a feature value, the lower "a" bytes of the sum of brightness values of pixels in a frame, and outputs an a-byte feature value per frame. The structures of the feature-value extracting unit 41 and a feature value extraction process will be described in detail below with reference to FIGS. 6 and 10, respectively.

A remote controller 14 includes keys and buttons. As shown in FIGS. 3 and 4, the remote controller 14 is operated by a user to specify a process to be performed on a desired image. The remote controller 14 generates an operation signal in accordance with the operation of the user, and generates a light emitting pattern such as an infrared pattern in accordance with the generated operation signal to emit light to a light receiving unit 44 of the image processing apparatus 13.

The light receiving unit 44 converts the light into an operation signal of the remote controller 14 on the basis of the light emitting pattern of the remote controller 14, and supplies the operation signal to an operation information recognizing unit 45. The operation information recognizing unit 45 recognizes operation information associated with the process to be performed on the desired image, which is specified by the user, on the basis of the operation signal supplied from the light receiving unit 44, and supplies a recognition result, namely, an operation signal, to a setting information determining unit 46. The accumulation block 43 can be controlled to be turned on or off in accordance with the operation information from the remote controller 14. Thus, when the operation information recognizing unit 45 recognizes operation information for controlling the accumulation block 43 to be turned on or off, the operation information recognizing unit 45 controls the operation of the accumulation block 43 to be turned on or off.

The setting information determining unit 46 determines setting information for instructing a reflecting unit 49, which will be described below, to process the image on the basis of the operation information supplied from the operation information recognizing unit 45, and supplies the setting information to the feature-value setting-information recording unit 61 and a selection unit 47.

The feature-value setting-information recording unit 61 in the accumulation block 43 accumulates in a feature-value setting-information accumulation unit 62 (which corresponds to the operation record storage unit 4 shown in FIGS. 3 and 4) the feature value supplied from the feature-value extracting unit 41 and the setting information supplied from the setting information determining unit 46 in association with each other.

The synchronization detecting unit 42 holds a-byte feature values for b (≤B) consecutive frames being played back by the image playback unit 12 (playback-position feature values, which will be described below), which are output in real time from the feature-value extracting unit 41. The value b depends on, for example, an information-amount evaluation value x output from the information-amount evaluation unit 50. The value b will be described in detail below.

The synchronization detecting unit 42 further extracts an (a×b)-byte feature value from the feature values accumulated in the feature-value setting-information accumulation unit 62. The (a×b)-byte feature value (search-position feature value, which will be described below) is then sequentially compared with an (a×b)-byte feature value supplied from the feature-value extracting unit 41 (playback-position feature value, which will be described below). When matching feature values are detected, the detection result is supplied as a synchronization position of the image to a feature-value setting-information reading unit 63. The structures of the synchronization detecting unit 42 and a synchronization detection process will be described in detail below with reference to FIGS. 8 and 12, respectively.

The information-amount evaluation unit 50 calculates, for example, an information-amount evaluation value x using a feature value output from the feature-value extracting unit 41. The information-amount evaluation value x represents the density of information included in an input signal in the time direction. A specific example of a process for calculating the information-amount evaluation value x will be described in detail below with reference to FIG. 13 and other figures.

Upon obtaining a feature value (search-position feature value) detected as a synchronization position by the synchronization detecting unit 42, the feature-value setting-information reading unit 63 reads the setting information stored in association with this feature value in the feature-value setting-information accumulation unit 62, and supplies the read setting information to the selection unit 47. When setting information is supplied from the setting information determining unit 46, the selection unit 47 supplies the setting information supplied from the setting information determining unit 46 to the reflecting unit 49 even if setting information is supplied from the feature-value setting-information reading unit 63 at the same time. When no setting information is supplied from the setting information determining unit 46 and when setting information is supplied from the feature-value setting-information reading unit 63, the selection unit 47 supplies the setting information supplied from the feature-value setting-information reading unit 63 to the reflecting unit 49. When no setting information is supplied from the setting information determining unit 46 or the feature-value setting-information reading unit 63, the selection unit 47 does not supply setting information to the reflecting unit 49.

The delay unit 48 temporarily stores the image supplied from the image playback unit 12 for a delay time involved in the processes of the feature-value extracting unit 41, the synchronization detecting unit 42, the accumulation block 43, and the selection unit 47, and then outputs the image to the reflecting unit 49. When setting information is supplied from the selection unit 47, the reflecting unit 49 reflects the process in the image supplied from the delay unit 48, and displays a resulting image on a display unit 15. If no setting information is supplied from the selection unit 47, the reflecting unit 49 directly displays the image supplied from the delay unit 48 on the display unit 15.

Figure 6:
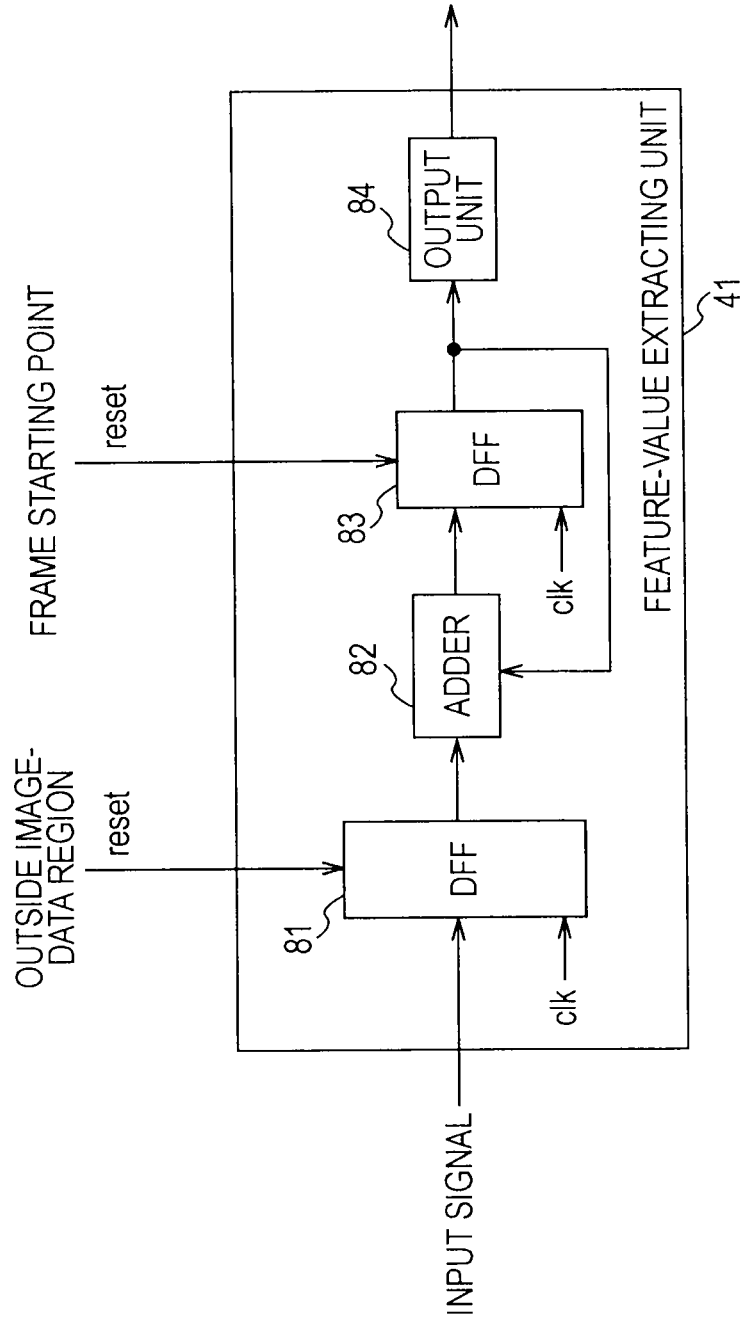
FIG. 6 is a block diagram showing an example structure of a feature-value extracting unit shown in FIG. 5.

The structure of the feature-value extracting unit 41 will now be described in detail with reference to FIG. 6.

Figure 7:
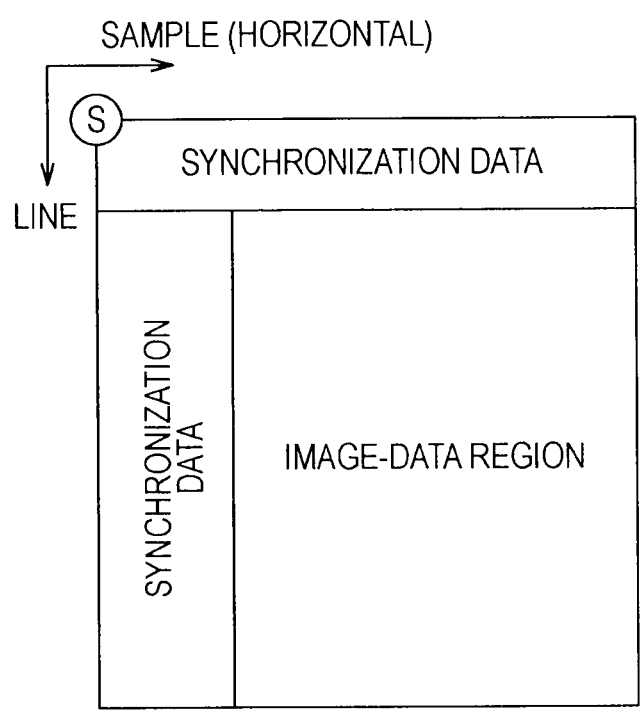
FIG. 7 is a diagram showing an example structure of an image signal.

A D-type flip flop (DFF) 81 stores a previous input signal and outputs the previous input signal to an adder 82 at a time when a clock signal (clk) is input from a clock signal generator (not shown). When an input signal is a signal outside an image-data region of an image signal, a reset signal is input to the DFF 81 and the input signal is canceled and is not output so that a signal within the image-data region can be output. As shown in FIG. 7, an image signal includes a synchronization-data region and an image-data region. In accordance with position information sequentially input from a frame starting point with encircled "S", which is the origin of samples in the horizontal direction and lines in the vertical direction in FIG. 7, a reset signal is input for synchronization data outside the image-data region, and a signal constituting the synchronization data is not output to the adder 82. That is, the DFF 81 supplies only data within the image-data region among input signals constituting an image to the adder 82 in synchronization with a clock signal.

The adder 82 sums a signal supplied from the DFF 81 and a signal supplied from a DFF 83, and outputs the sum to the DFF 83. More specifically, the adder 82 extracts the lower "a" bytes of the sum of the signal supplied from the DFF 81 and the signal supplied from the DFF 83, and outputs the extracted lower "a" bytes to the DFF 83.

The DFF 83 supplies the signal supplied from the adder 82 to the adder 82 and an output unit 84 at a time when a clock signal (clk) generated by a clock generator (not shown) is input. Further, when the signal indicating the frame starting point with encircled "S" (which is the origin of samples in the horizontal direction and lines in the vertical direction in FIG. 7) is input, a reset signal is input to the DFF 83 and the input signal is canceled and is not output. That is, the DFF 83 supplies a value obtained by accumulatively adding, using the adder 82, only data within the image-data region among input signals constituting an image to the output unit 84.

When a value of one frame is supplied from the DFF 83, the output unit 84 outputs this value as a feature value of an image for the frame. That is, the output unit 84 outputs, as a feature value for this frame, the lower "a" bytes of a value obtained by accumulatively adding, using the adder 82, only data within the image-data region. Since a feature value may be any information capable of identifying an image frame-by-frame, a feature value is not limited to the lower "a" bytes of a value obtained by accumulatively adding only data within the image-data region (only pixel values). For example, the sum of only pixel values in a predetermined region near the center of the image-data region may be directly used as a feature value. Here, it is assumed that the lower "a" bytes of the sum of brightness values of pixels in a frame are output as a feature value.

Figure 8:
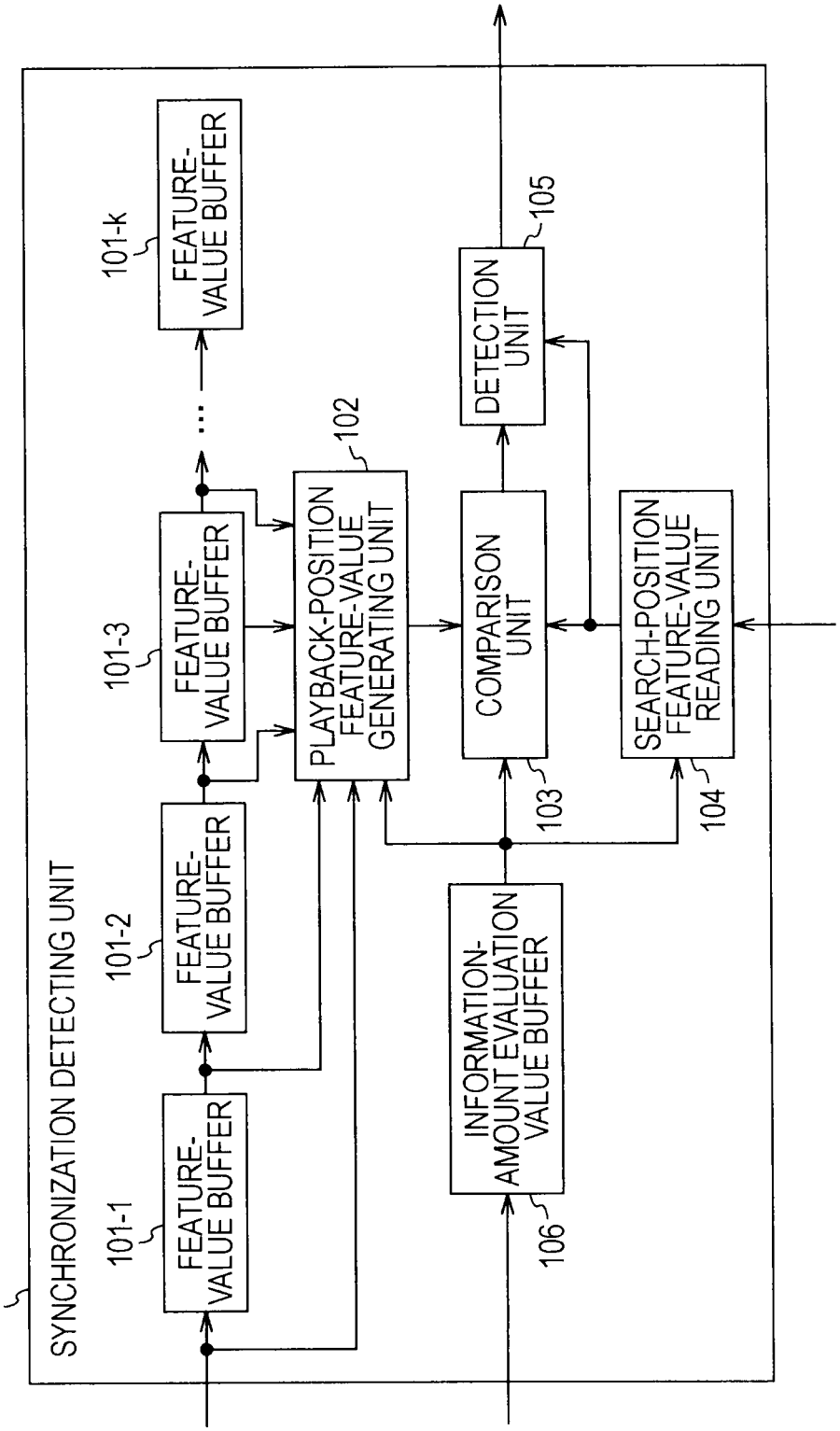
FIG. 8 is a block diagram showing an example structure of a synchronization detecting unit shown in FIG. 5.

Next, the structure of the synchronization detecting unit 42 will be described in detail with reference to FIG. 8.

Each of feature-value buffers 101-1 to 101-K stores a-byte feature values for b ($\leq$B) consecutive frames, which are output from the feature-value extracting unit 41, and sequentially outputs the previous stored feature values to a playback-position feature-value generating unit 102 and subsequent feature-value buffers 101-2 to 101-K. Since there is no feature-value buffer subsequent to the feature-value buffer 101-K, the feature-value buffer 101-K outputs feature values only to the playback-position feature-value generating unit 102. The playback-position feature-value generating unit 102 sequentially obtains feature values for b frames among the last K frames including up-to-date feature values supplied from the feature-value buffers 101-1 to 101-K to produce a playback-position feature value including the feature values for b frames, and outputs the playback-position feature value to a comparison unit 103.

A search-position feature-value reading unit 104 extracts an (a×b)-byte feature value from among the feature values accumulated in the feature-value setting-information accumulation unit 62. Then, the search-position feature-value reading unit 104 sequentially supplies the extracted (a×b)-byte feature value (search-position feature value, which will be described below) to the comparison unit 103 and a detection unit 105. The comparison unit 103 compares the playback-position feature value supplied from the playback-position feature-value generating unit 102 with the search-position feature value sequentially supplied from the search-position feature-value reading unit 104. When a search-position feature value that matches the playback-position feature value is found, the comparison unit 103 determines that synchronization is detected, and notifies the detection unit 105 of a detection result which indicates that synchronization is detected. The detection unit 105 outputs a synchronization detection result to the feature-value setting-information reading unit 63. That is, the search-position feature value supplied from the search-position feature-value reading unit 104 at a time when the comparison unit 103 determines that synchronization is detected is output to the feature-value setting-information reading unit 63.

An information-amount evaluation value buffer 106 temporarily stores an information-amount evaluation value x output from the information-amount evaluation unit 50, and outputs the previous stored information-amount evaluation value x to the playback-position feature-value generating unit 102, the comparison unit 103, and the search-position feature-value reading unit 104. The information-amount evaluation value x output here is used to determine the number of matching frames b.

Next, an image process performed by the image processing apparatus 13 shown in FIG. 5 will be described with reference to a flowchart shown in FIG. 9. In the following description, it is assumed that the accumulation block 43 has been controlled to be turned on.

In step S1, the delay unit 48 determines whether or not a new image has been supplied from the image playback unit 12. The delay unit 48 repeats this processing until a new image has been supplied.

For example, when the image playback unit 12 reads an image recorded on the recording medium 11 and the delay unit 48 determines that a new image has been supplied, then in step S2, the delay unit 48 temporarily stores the supplied image to delay the image for a period of one frame. In the following description, it is assumed that an image is processed on a frame-by-frame basis. However, as can be understood, for example, an image may be processed on a field-by-field basis instead of on a frame-by-frame basis.

In step S3, the feature-value extracting unit 41 executes a feature-value extraction process to extract a feature value of an image for one frame supplied from the image playback unit 12. When the delay unit 48 temporarily stores a new image to delay the image for a period of one frame, an image for one frame is also supplied to the feature-value extracting unit 41. Thus, one of identical images is temporarily stored for delay and, at the same time, a feature value is extracted from the other image.

Figure 10:
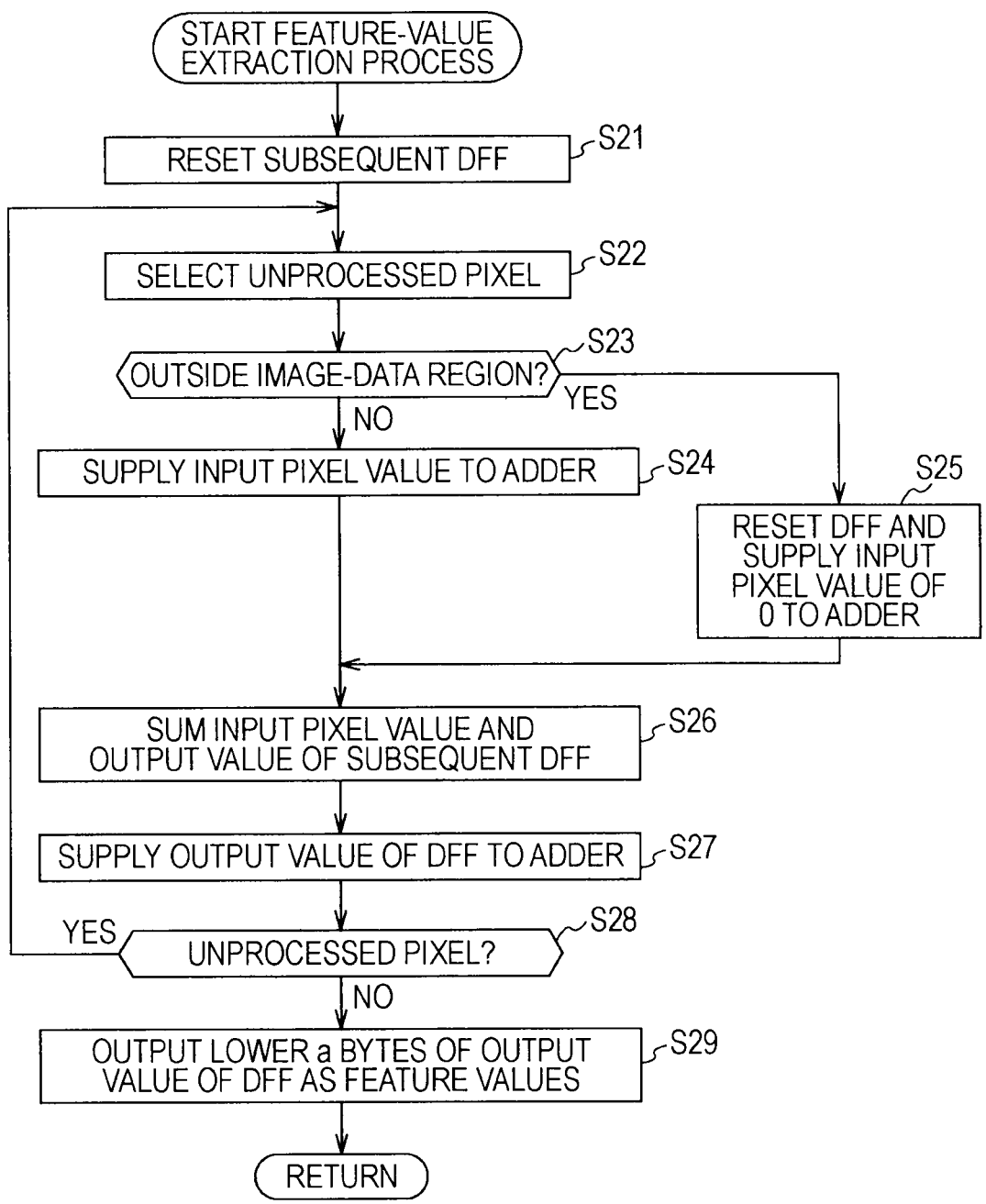
FIG. 10 is a flowchart showing a feature-value extraction process performed by the feature-value extracting unit shown in FIG. 6.

Here, the feature-value extraction process in step S3 will be described with reference to a flowchart shown in FIG. 10.

In step S21, the DFF 83 is reset in response to the frame starting point S (see FIG. 7).

In step S22, an unprocessed pixel is selected. In step S23, it is determined whether or not the selected pixel is outside the image-data region. More specifically, for example, unprocessed pixels are sequentially read from an image for one frame in raster scan order, and it is determined whether or not each of the read pixels is outside the image-data region.

As shown in FIG. 7, since the first pixel (the pixel at the frame starting point S) is included in the synchronization data, this pixel is outside the image-data region. Then, in step S25, the DFF 81 is reset and value 0 is out as a pixel value. On the other hand, for example, if a pixel selected as a process target in raster scan order is in the image-data region, then in step S24, the DFF 81 supplies the pixel value to the adder 82 at a time when a clock signal is generated.

In step S26, the adder 82 sums the input pixel value and the signal supplied from the DFF 83, and supplies the sum to the DFF 83.

In step S27, the DFF 83 returns the lower "a" bytes of the sum supplied from the adder 82 to the adder 82 at a time when a clock signal is generated. The DFF 83 also supplies the sum to the output unit 84. However, the output unit 84 does not output the sum.

In step S28, it is determined whether or not an unprocessed pixel remains. If an unprocessed pixel remains, the process returns to step S22. That is, the processing of steps S22 to S28 is repeated until all pixels for one frame have been processed. If it is determined that all pixels for one frame have been processed, then in step S29, the output unit 84 outputs the lower "a" bytes of the sum supplied from the DFF 83, that is, the lower "a" bytes of the accumulative sum of the pixel values in the image-data region, as feature values for this frame.

With the process described above, the lower "a" bytes of the accumulative sum of all pixel values in the image-data region are extracted from an image signal for one frame as a feature value for this frame.

Figure 9:
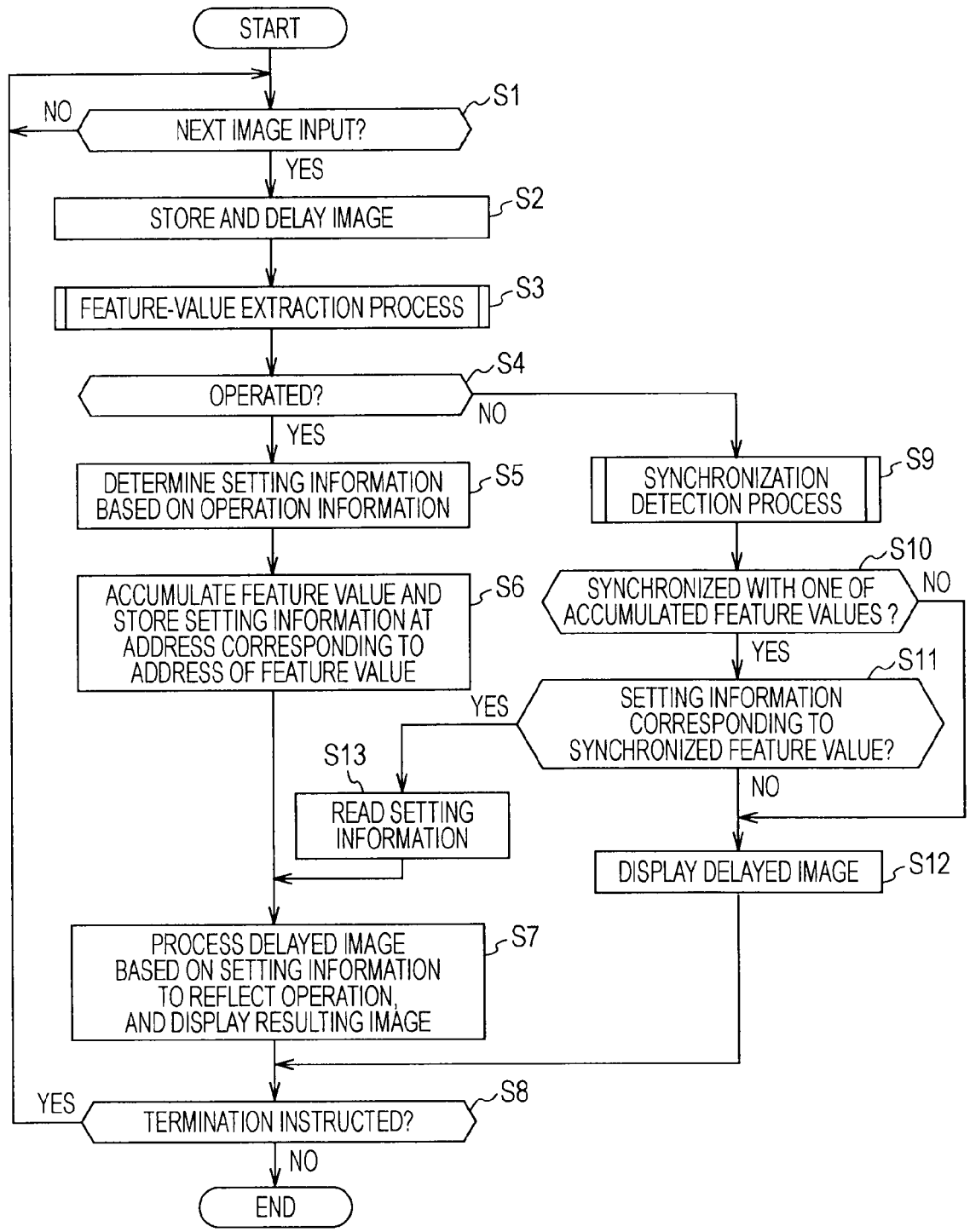
FIG. 9 is a flowchart showing an image process performed by the image processing apparatus shown in FIG. 5.

Referring back to the flowchart shown in FIG. 9, in step S4, the operation information recognizing unit 45 determines whether or not a user has operated the remote controller 14 and has specifies a process to be performed on the image. For example, when a user specifies double zooming while viewing an image displayed on the display unit 15, a light emitting pattern from the remote controller 14 is received by the light receiving unit 44, and a signal based on the light emitting pattern received by the light receiving unit 44 is supplied to the operation information recognizing unit 45. Accordingly, the operation information recognizing unit 45 determines that an operation has been performed. Then, the process proceeds to step S5.

In step S5, the operation information recognizing unit 45 recognizes operation information on the basis of the signal supplied from the light receiving unit 44, and supplies the operation information as a recognition result to the setting information determining unit 46. The setting information determining unit 46 determines, based on the operation information, setting information for allowing the reflecting unit 49 to perform the process on the image, and supplies the setting information to the feature-value setting-information recording unit 61 and the selection unit 47. In this case, since double zooming has been specified as a process to be performed on the image, setting information for instructing the reflecting unit 49 to perform double zooming is determined and supplied to the feature-value setting-information recording unit 61 and the selection unit 47.

Figure 11:
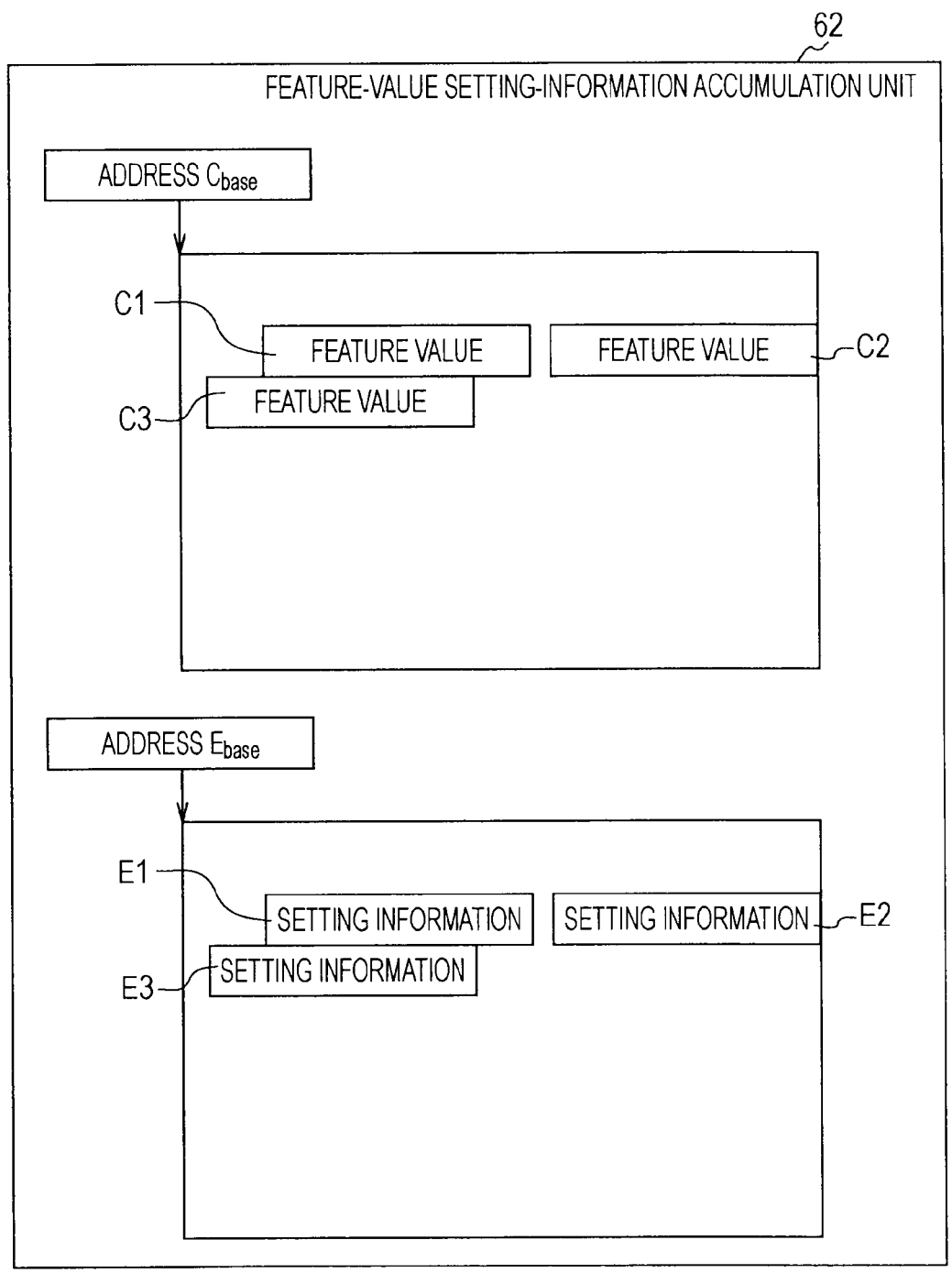
FIG. 11 is a block diagram showing an example structure of a feature-value setting-information accumulation unit shown in FIG. 5.

In step S6, the feature-value setting-information recording unit 61 records the feature value supplied from the feature-value extracting unit 41 into the feature-value setting-information accumulation unit 62, and also records the setting information supplied from the setting information determining unit 46 into the feature-value setting-information accumulation unit 62 in association with the feature value. Accordingly, the feature value and the setting information are accumulated. More specifically, as shown in FIG. 11, when a feature value C1 is recorded at a predetermined address Cbase+A, setting information E1 associated with the feature value C1 is stored at an address Ebase+m×A. In FIG. 11, the arrangement of addresses where feature values and pieces of setting information are stored in the feature-value setting-information accumulation unit 62 is illustrated. Here, it is assumed that the region where feature values are accumulated has a beginning address Cbase and that the region where pieces of setting information are accumulated has a beginning address Ebase. Further, m is a predetermined rational number and is set to, for example, a value indicating how many times larger than the size of a feature value per frame the size of setting information per frame is.

Similarly, the feature-value setting-information recording unit 61 stores a feature value C2 at an address Cbase+B as well as storing corresponding setting information E2 at an address Ebase+m×B, and stores a feature value C3 at an address Cbase+C as well as storing corresponding setting information E3 at an address Ebase+m×C. In this manner, pieces of setting information are stored in association with individual feature values so that if a feature value is determined, the address of the setting information can be identified from the address of the feature value. Therefore, a piece of setting information for each feature value can be smoothly searched for in the feature-value setting-information accumulation unit 62. Note that feature values and pieces of setting information are continuously recorded for a period during which a certain process is continuously specified. For example, in FIG. 11, each of the feature values C1 to C3 is not limited to a feature value per frame, and feature values for the number of frames within a period during which a process is continuously specified are continuously recorded. Similarly, pieces of setting information are also continuously recorded. That is, for example, each of the pieces of setting information E1 to E3 shown in FIG. 11 is not limited to setting information per frame from the addresses associated with the feature values C1 to C3, and pieces of setting information for the number of frames within a period during which a process is continuously specified are continuously recorded.

In step S7, since setting information has been supplied from the setting information determining unit 46, the selection unit 47 supplies the setting information supplied from the setting information determining unit 46 to the reflecting unit 49. The reflecting unit 49 applies a process based on the setting information supplied from the selection unit 47 to the image stored in the delay unit 48 so that the process specified by the user can be reflected in the image, and displays a resulting image on the display unit 15.

In step S8, the operation information recognizing unit 45 determines whether or not an instruction for terminating the operation has been issued. If it is determined that an instruction for terminating the operation has been issued, the process ends. If it is determined that an instruction for terminating the operation has not been issued, the process returns to step S1.

Thus, as long as the user continuously instructs the image to be processed by operating the remote controller 14, the processing of steps S1 to S8 is repeated. That is, a feature value and setting information corresponding to the process are accumulated in association with each other in the feature-value setting-information accumulation unit 62. The operation performed by repeating the processing of steps S1 to S8 corresponds to the operation in the recording mode described with reference to FIGS. 3 and 4.

If it is determined in step S4 that the remote controller 14 is not operated, the process proceeds to step S9. Then, the synchronization detecting unit 42 executes a synchronization detection process to detect synchronization between a feature value of an image being played back and a feature value associated with setting information for processing the image.

Figure 12:
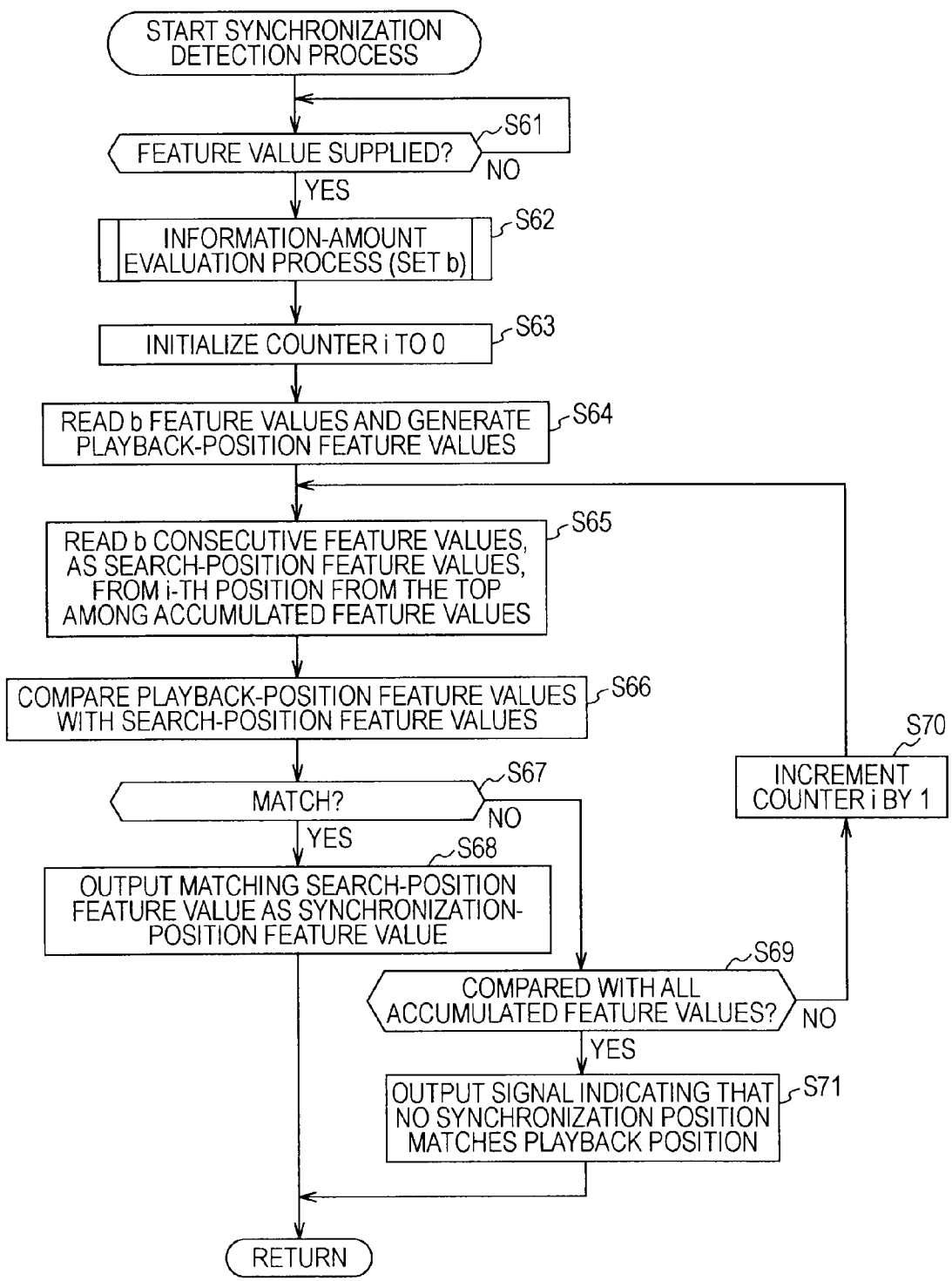
FIG. 12 is a flowchart showing a synchronization detection process performed by the synchronization detecting unit shown in FIG. 8.

The synchronization detection process in step S9 will now be described with reference to a flowchart shown in FIG. 12.

In step S61, the playback-position feature-value generating unit 102 in the synchronization detecting unit 42 determines whether or not a feature value has been supplied from the feature-value extracting unit 41. The playback-position feature-value generating unit 102 repeats the processing until a feature value has been supplied. For example, a feature value is extracted using the feature-value extraction process in step S3, and a feature value of an image being currently played back is supplied from the feature-value extracting unit 41. Then, the process proceeds to step S62.

In step S62, the synchronization detecting unit 42 executes an information-amount evaluation process to determine the number of matching frames b on the basis of, for example, the information-amount evaluation value x sent from the information-amount evaluation unit 50.

The number of matching frames b is determined using, for example, Equation (1) as follows:

$$b = \min(\lceil B_{base}/x \rceil, B) \quad (1)$$

where $B_{base}$ is defined in advance as the number of reference matching frames that can ensure sufficient frame identification performance if the feature values for the respective frames are assumed to be completely random. Further, in Equation (1), the sign surrounding $B_{base}/x$ denotes an integer value obtained by rounding up after the decimal point of $B_{base}/x$. The same applies to Equation (3).

Various specific examples of the information-amount evaluation process will be described below with reference to FIG. 15 and following figures.

In step S63, the search-position feature-value reading unit 104 initializes a counter i for counting a feature value at a search position to 0.

In step S64, the playback-position feature-value generating unit 102 reads b feature values from the feature value supplied from the feature-value extracting unit 41 and the previous feature values stored in the feature-value buffers 101-1 to 101-K, and generates a playback-position feature value. The b feature values correspond to an (a×b)-byte synchronized feature value Δcurrent, and are used as a playback-position feature value. The playback-position feature value is supplied to the comparison unit 103.

In step S65, the search-position feature-value reading unit 104 reads, as a search-position feature value, b consecutive feature values which start from the i-th position from the top among the feature values accumulated in the feature-value setting-information accumulation unit 62. That is, feature values for b consecutive frames which start from the i-th position from the top of the feature values accumulated in the feature-value setting-information accumulation unit 62 correspond to an (a×b)-byte synchronized feature value Δrec, and are used as a search-position feature value. The search-position feature value is supplied to the comparison unit 103 and the detection unit 105.

In step S66, the comparison unit 103 compares the playback-position feature value (the (a×b)-byte synchronized feature value Δcurrent) with the search-position feature value (the (a×b)-byte synchronized feature value Δrec).

In step S67, the comparison unit 103 determines whether or not matching is found. For example, if it is determined in step S67 that no matching is found, in step S69, the search-position feature-value reading unit 104 determines whether or not the playback-position feature value has been compared with all the feature values accumulated in the feature-value setting-information accumulation unit 62. For example, if it is determined in step S69 that the playback-position feature value has not yet been compared with all the feature values, in step S70, the search-position feature-value reading unit 104 increments the counter i by 1. Then, the process returns to step S65. Thus, the processing of steps S65 to S67, S69, and S70 is repeated until the playback-position feature value has been compared with all the accumulated feature values because the playback-position feature value matches no search-position feature value. That is, the comparison between the playback-position feature value and a search-position feature value constituted by feature values for b consecutive frames is repeatedly performed with the search-position feature value shifted in steps of one frame.

Figure 13:
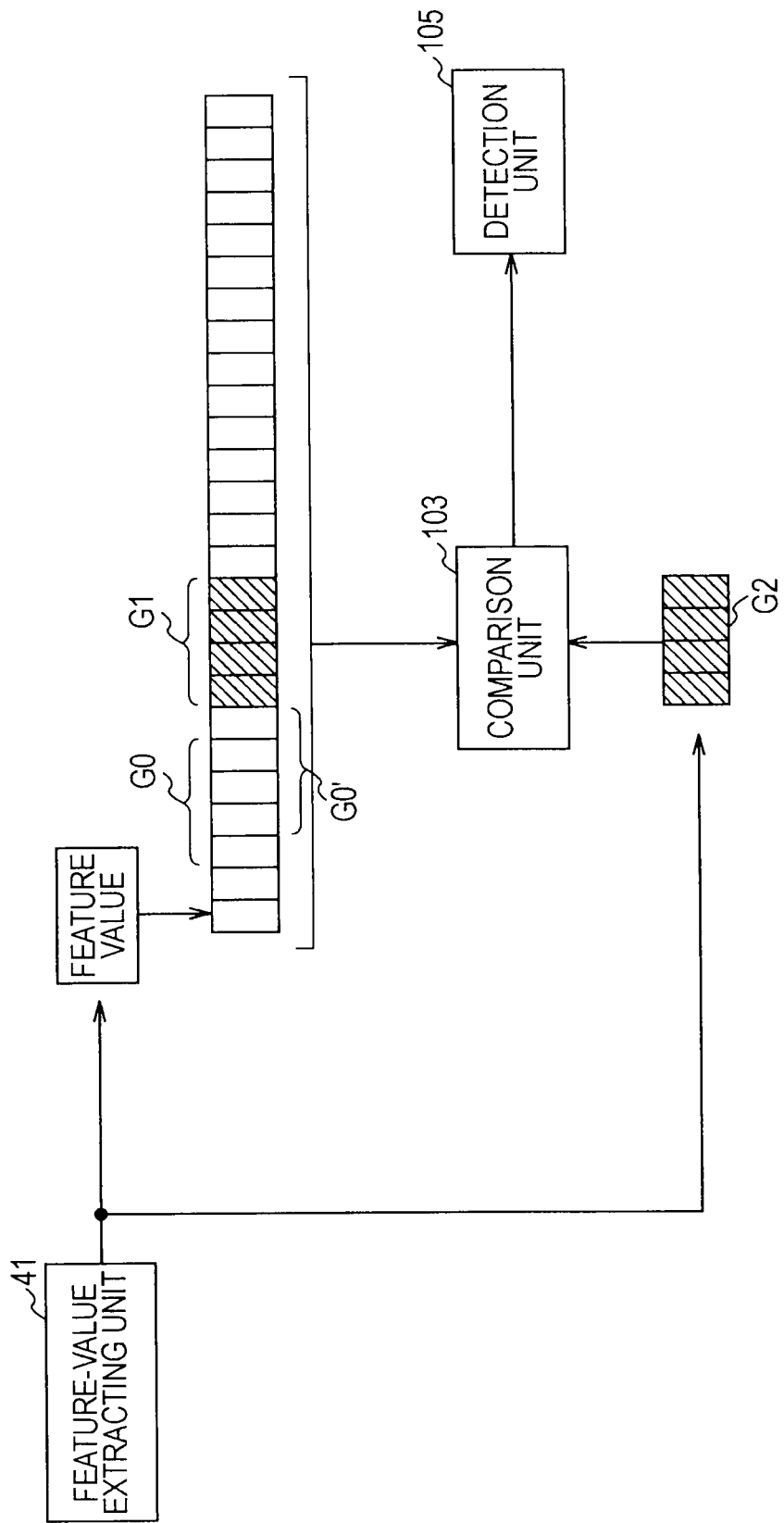
FIG. 13 is a diagram showing the synchronization detection process performed by the synchronization detecting unit shown in FIG. 8.

Specifically, a search-position feature value is, for example, as shown in an upper right portion of FIG. 13, a collection of b consecutive feature values among the feature values sequentially accumulated in the feature-value extracting unit 41. In FIG. 13, each vertically long rectangular block indicates a feature value per frame, and hatched portions in feature values G1 and G2 indicate that identical consecutive feature values are arranged. Further, a playback-position feature value is, as shown in a lower right portion of FIG. 13, a collection of feature values for b consecutive frames including a feature value of an image being played back, which is supplied from the feature-value extracting unit 41.

For example, as shown in FIG. 13, when a playback-position feature value is represented by G2, no matching is found between the playback-position feature value G2 and a search-position feature value G0. Thus, no synchronization position is detected. Since the playback-position feature value G2 has not yet been compared with all accumulated feature values, the counter i is incremented by 1, and a search-position feature value G0' is compared with the playback-position feature value G2. In this manner, the comparison between a search-position feature value and the playback-position feature value G2 is repeatedly performed with the search-position feature value shifted in steps of one frame to the right in FIG. 13.

In step S67, for example, when the playback-position feature value G2 is compared with the search-position feature value G1, it is determined that matching is found because the search-position feature value G1 is identical in construction to the playback-position feature value G2. Then, in step S68, the comparison unit 103 notifies the detection unit 105 that matching is found. In accordance with this notification, the detection unit 105 supplies the top portion of the search-position feature value currently supplied from the search-position feature-value reading unit 104, that is, the i-th feature value from the top, as a synchronization-position feature value, to the feature-value setting-information reading unit 63.

On the other hand, if it is determined in step S69 that the playback-position feature value has been compared with all the accumulated search-position feature values, in step S71, the detection unit 105 outputs a signal indicating that no synchronization is detected because of no presence of a search-position feature value that matches the playback-position feature value.

With the process described above, a feature value accumulated in the feature-value setting-information accumulation unit 62 can be synchronized with a feature value of an image being played back. Specifically, in order to reduce the possibility of synchronization being detected at an incorrect position due to accidental matching between feature values when only a feature value of a frame being played back is compared with a feature value accumulated in the feature-value setting-information accumulation unit 62, the synchronization detecting unit 42 performs comparison using not only a feature value of a frame being currently played back but also b frames including the frame being played back. Therefore, more accurate synchronization detection can be implemented. Furthermore, with the use of feature values in this manner, feature values can be set instead of time code per frame, resulting in frame-by-frame synchronization detection without using time code.

Figure 14:
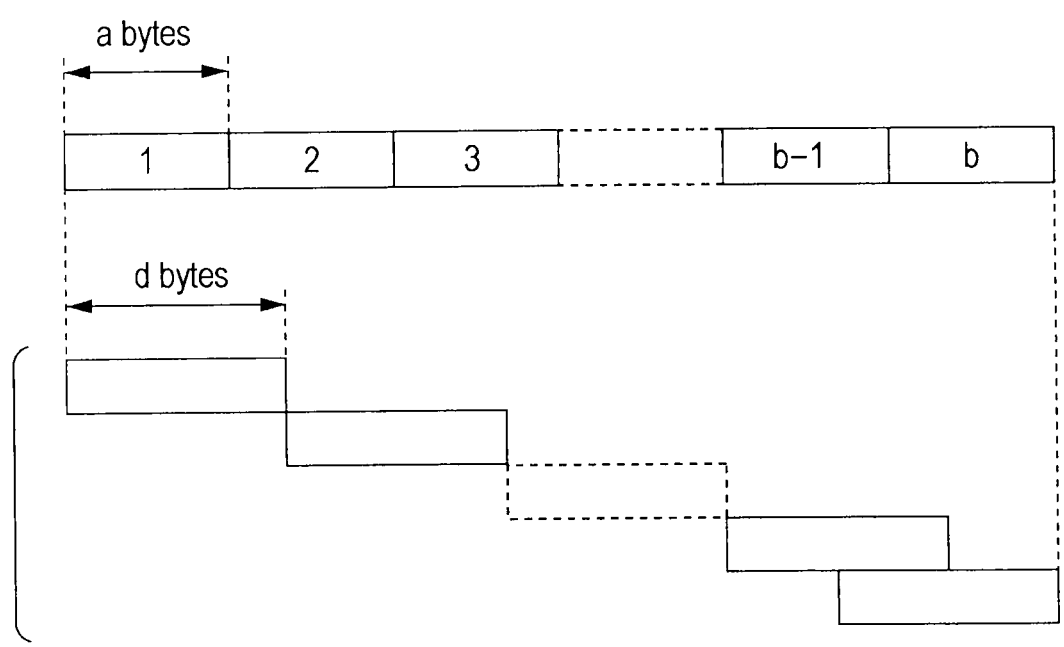
FIG. 14 is a diagram showing another example of the synchronization detection process performed by the synchronization detecting unit shown in FIG. 8.

The (a×b)-byte synchronization process can also be implemented by, as shown in FIG. 14, executing synchronization of a fixed length of d (≤(a×b)) bytes a plurality of times. Such divisional operations may be executed when uniform synchronization data lengths are to be obtained, when the value given by a×b is large, or any other case.

Referring back to the flowchart shown in FIG. 9, in step S10, the feature-value setting-information reading unit 63 determines whether or not the playback-position feature value of the frame being played back matches one of the feature values accumulated in the feature-value setting-information accumulation unit 62. For example, when a synchronization-position feature value is supplied using the processing of step S68 of the flowchart shown in FIG. 12, it is determined that the playback-position feature value of the frame being played back matches one of the feature values accumulated in the feature-value setting-information accumulation unit 62. Thus, the process proceeds to step S11.

In step S11, the feature-value setting-information reading unit 63 determines whether or not setting information associated with the synchronized feature value has been accumulated in the feature-value setting-information accumulation unit 62. Feature values can be accumulated in the feature-value setting-information accumulation unit 62 even when no setting information is associated. Thus, in this processing, the presence of setting information associated with the feature value is determined.

For example, if it is determined in step S11 that setting information that is associated with the feature value has not been accumulated, in step S12, the feature-value setting-information reading unit 63 supplies no setting information to the selection unit 47. Accordingly, no setting information is supplied to the selection unit 47 from the setting information determining unit 46 or the feature-value setting-information reading unit 63, and setting information for specifying a process is not supplied to the reflecting unit 49. Consequently, the reflecting unit 49 displays an image for one frame, which has been temporarily stored in the delay unit 48, on the display unit 15 without modifying the image.

On the other hand, if it is determined in step S11 that the setting information associated with the feature value has been accumulated, in step S13, the feature-value setting-information reading unit 63 reads the setting information accumulated in association with the feature value corresponding to the synchronization-position feature value in the feature-value setting-information accumulation unit 62, and supplies the read setting information to the selection unit 47. Then, the process proceeds to step S7. In this case, the selection unit 47 receives no setting information from the setting information determining unit 46 but receives setting information from the feature-value setting-information reading unit 63. Thus, the setting information supplied from the feature-value setting-information reading unit 63 is supplied to the reflecting unit 49. Based on the setting information, the process is reflected in the image for one frame which has been accumulated in the delay unit 48, and a resulting image is displayed on the display unit 15.

The processing of steps S1 to S4, S9 to S13, S7, and S8 corresponds to the process in the playback mode described with reference to FIGS. 3 and 4.

Some specific examples of the information-amount evaluation process in step S62 shown in FIG. 12 will now be described.

In the following, for simplicity of description, the processing of respective steps of the information-amount evaluation process is performed by the information-amount evaluation unit 50. However, the processing may be performed by any section other than the information-amount evaluation unit 50. As described above, a portion of the processing may be performed by a separate block such as the synchronization detecting unit 42.

Figure 15:
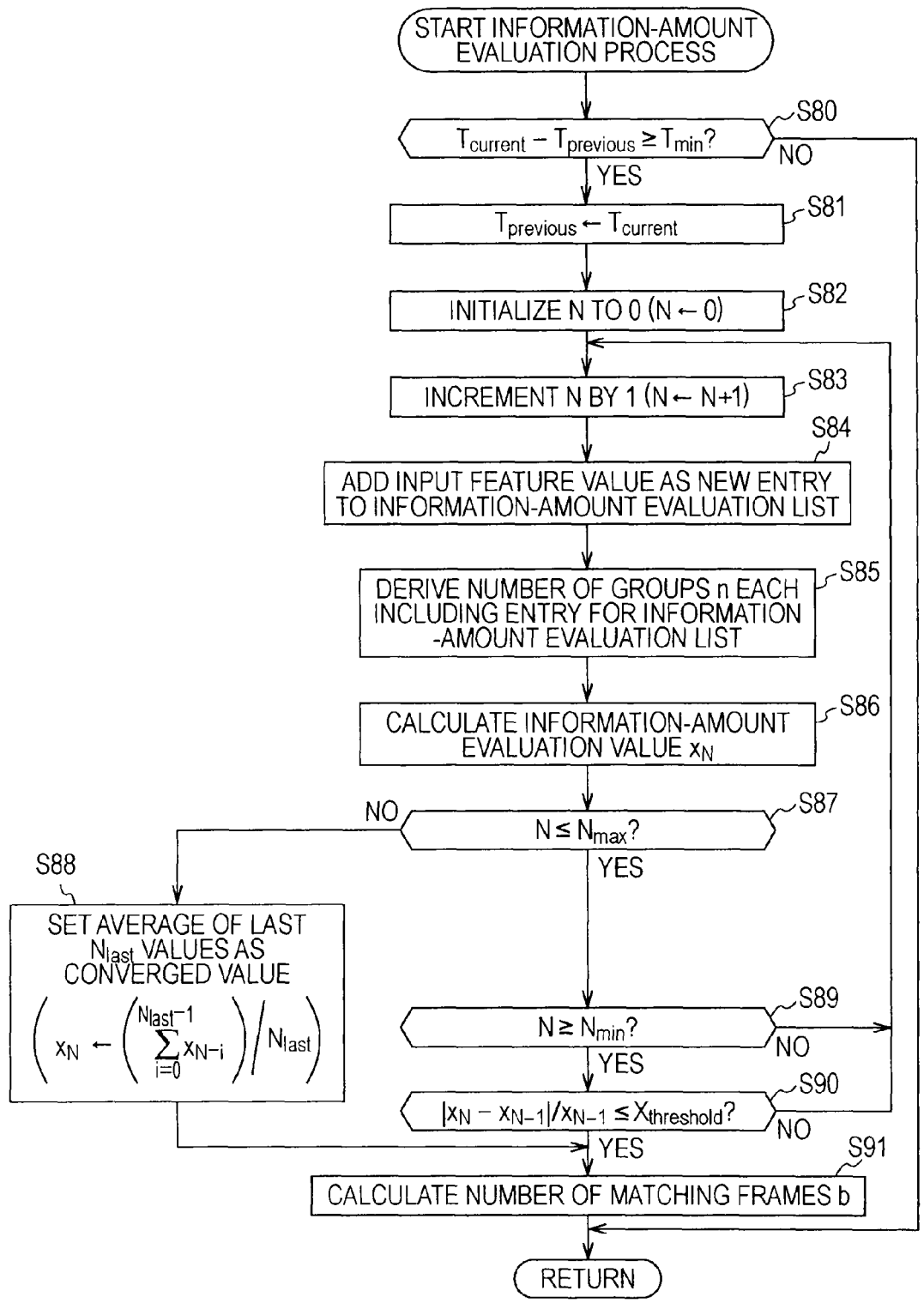
FIG. 15 is a flowchart showing a first example of an information-amount evaluation process in the synchronization detection process shown in FIG. 12.

FIG. 15 shows an example of an information-amount evaluation process for calculating an information-amount evaluation value x using an information-amount evaluation list. Here, the number of matching frames b is used as a final output value.

In step S80, the information-amount evaluation unit 50 determines whether or not $T_{current} - T_{previous} \geq T_{min}$.

Specifically, if the time elapsed from the previous process start time $T_{previous}$ to the current time $T_{current}$ (the current time $T_{current}$ minus the previous process time $T_{previous}$) does not exceed a predetermined time $T_{min}$, a negative determination is obtained in step S80, and the information-amount evaluation process ends.

On the other hand, if the time elapsed from the previous process start time $T_{previous}$ to the current time $T_{current}$ (the current time $T_{current}$ minus the previous process time T$_{previous}$) exceeds the predetermined time T$_{min}$, a positive determination is obtained in step S80. Then, the process proceeds to step S81.

In step S81, the information-amount evaluation unit 50 sets the process start time T$_{previous}$ to the current time T$_{current}$.

In step S82, the information-amount evaluation unit 50 initializes a value N to 0.

In step S83, the information-amount evaluation unit 50 increments the value N by 1 (N←N+1).

In step S84, the input feature value is added as a new entry to the information-amount evaluation list.

In step S85, the information-amount evaluation unit 50 derives the number of groups n each including an entry for the information-amount evaluation list.

In step S86, the information-amount evaluation unit 50 calculates an information-amount evaluation value x$_N$.

The processing of steps S84 to S86 will now be described in more detail.

Figure 16A:
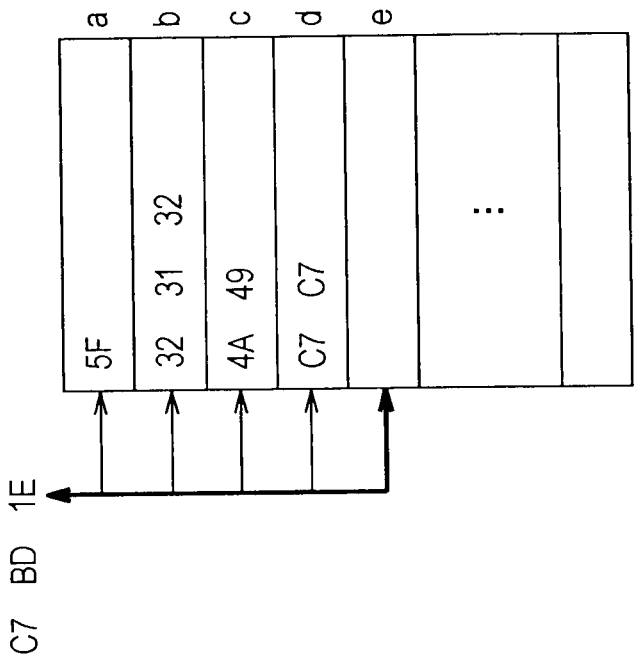
FIGS. 16A and 16B are diagrams showing an example structure of an information-amount evaluation list used in the information-amount evaluation process shown in FIG. 15.
Figure 16B:
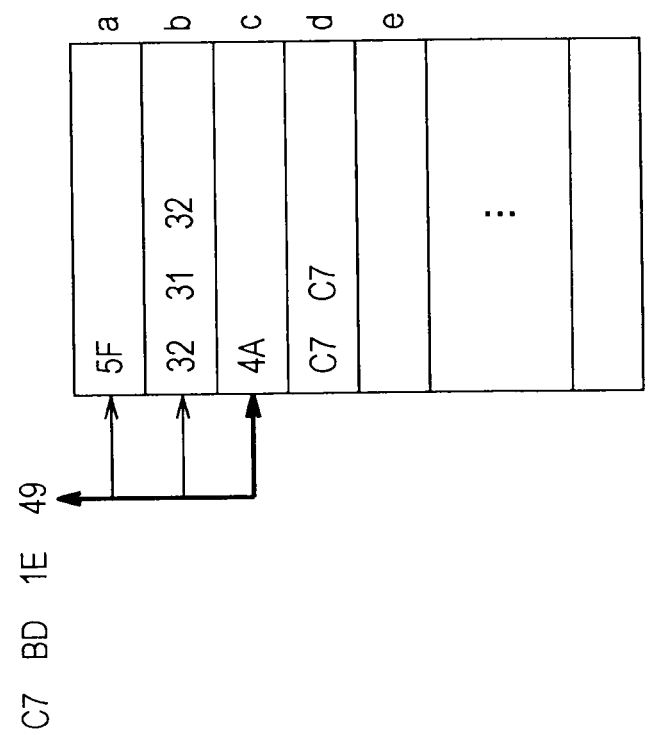

For example, FIGS. 16A and 16B show an example of an information-amount evaluation list. In the information-amount evaluation list, each row represents one group. The respective rows are assigned groups names a, b, c, d, e, and so forth at the right margin.

The information-amount evaluation unit 50 searches top entries Δk(k<j) of the individual groups in the information-amount evaluation list for an entry that meets the condition of |Δk−Δj|<σ, where Δj denotes the input feature value. The value σ depends on noise resistance. The lower the noise of the input feature value, the smaller value the value σ is set to.

If an entry close to the input feature value Δj, that is, an entry that meets the condition described above, exists, the information-amount evaluation unit 50 stores the feature value Δj in the same group as that of this entry to add the input feature value Δj as a new entry to the information-amount evaluation list.

For example, in the example shown in FIGS. 16A and 16B, as shown in FIG. 16A, "49" is set as the input feature value Δj. In this case, as shown in FIG. 16A, the information-amount evaluation unit 50 determines process targets in the order of the groups a, b, c, and d, and determines whether or not the first entry Δk in each process target group meets the condition of |Δk−Δj|<σ. For example, in the example shown in FIG. 16A, the first entry Δk in the group a is "5F", the first entry Δk in the group b is "32", the first entry Δk in the group c is "4A", and the first entry Δk in the group d is "C7". If the first entry in a given group does not meet the above condition, the information-amount evaluation unit 50 sets the subsequent group as a process target, and determines whether or not the first entry Δk in the process target group meets the condition of |Δk−Δj|<σ.

Here, it is assumed that the first entry Δk in the group c, "4A", meets the condition of |Δk−Δj|<σ. In this case, as shown in FIG. 16B, the feature value Δk, "49", is stored in the group c.

Next, for example, as shown in FIG. 16B, "1E" is set as the input feature value Δj, and it is assumed that none of the first entries Δk in the groups a to d meets the condition of |Δk−Δj|<σ.

In this case, the information-amount evaluation unit 50 determines that there is no entry close to the input feature value Δj, and stores the input feature value Δj, "1E", in a new group (in the example shown in FIG. 16B, a group e). Therefore, the input feature value Δj is added as a new entry to the information-amount evaluation list.

The information-amount evaluation unit 50 derives the number of groups n each including an entry for information-amount evaluation list. Then, the information-amount evaluation unit 50 calculates an information-amount evaluation value x$_N$ using Equation (2) as follows:

$$x_N = n/N \quad (0 < x \leq 1) \qquad (2)$$

In Equation (2), the information-amount evaluation value x$_N$ is a simple quantitative value indicating the degree of dispersion of feature values for N adjacent frames. The larger the information-amount evaluation value x, the higher the degree of dispersion. The amount of information included is therefore large.

The information-amount evaluation value x$_N$ calculated using Equation (2) is a general value compatible with a relatively large range of backgrounds of video signals. Thus, the information-amount evaluation value x$_N$ is distinguished from the information-amount evaluation value x obtained using a special process such as "determining the value of the information-amount evaluation value x on the basis of the result of a process special to a specific background such as 2-3 pull-down determination".

For example, in still image inputs, patterns such as "ABAB . . . (interlaced)" and "AAAA . . . (progressive)" appear and x$_N$=2/N and x$_N$=1/N are obtained, respectively. In 2-3 pull-down inputs, patterns such as "AABBCCDDD . . . (24p→60p)" and "ABCDCEFGHG . . . (24p→60i)" appear and, as the value N increases, the values x$_N$ converge to ⅖ and ⅘, respectively. In the latter, the value N is set to 5 or more.

In addition to the method described above, various methods for deriving an information-amount evaluation value x$_N$ are conceivable. For example, a technique based on a proportion in which the difference between feature values of adjacent frames is less than a threshold value (|Δj+1−Δj|<σ) can be adopted. An information-amount evaluation process based on this technique will be described below.

When the information-amount evaluation value x$_N$ is calculated in the manner described above using the processing of step S86, the process proceeds to step S87.

In step S87, the information-amount evaluation unit 50 determines whether or not N≤N$_{max}$. Specifically, if the number of frames N for which feature values have been obtained is not equal to or less than a predetermined upper limit N$_{max}$ of the number of frames for which feature values have been obtained, a negative determination is obtained in step S87, and it is determined that there is no converge of the information-amount evaluation value x$_N$. Then, the process proceeds to step S88.

In step S88, the information-amount evaluation unit 50 sets the average of the last N$_{last}$ values as a converged value. That is, the information-amount evaluation unit 50 sets this converged value as the information-amount evaluation value x$_N$. Then, the process proceeds to step S91. It is assumed that the value N$_{last}$ is defined in advance.

On the other hand, if it is determined in step S87 that the number of frames N for which feature values have been obtained is equal to or less than the upper limit N$_{max}$, the process proceeds to step S89.

In step S89, the information-amount evaluation unit 50 determines whether or not N≥N$_{min}$. A lower limit N$_{min}$ of the number of frames for which feature values have been obtained is determined in advance. For example, in the case of 2-3 pull-down, assuming that N$_{min}$=5, the information-amount evaluation value x$_N$ is calculated using feature values for a minimum number of 5 frames.

If the number of frames N for which feature values have been obtained is not equal to or greater than the lower limit N$_{min}$, a negative determination is obtained in step S89. Then, the process returns to step S83, and the subsequent processing is repeated.

On the other hand, if it is determined in step S89 that the number of frames N for which feature values have been obtained is equal to or greater than the lower limit $N_{min}$, the process proceeds to step S90.

In step S90, the information-amount evaluation unit 50 determines whether or not $|x_N-x_{N-1}|/x_{N-1} \leq X_{threshold}$. Specifically, the information-amount evaluation unit 50 determines the degree of convergence of the information-amount evaluation value $x_N$. If the changing rate from the previously calculated information-amount evaluation value $x_{N-1}$ is equal to or less than a threshold value ($X_{threshold}$) when the number of frames N for which feature values have been obtained increases, a positive determination is obtained in step S90, and the value $x_N$ is set as a converged value. Then, the process proceeds to step S91. On the other hand, if the changing rate from the information-amount evaluation value $x_{N-1}$ is not equal to or less than the threshed value ($X_{threshold}$), a negative determination is obtained in step S90. Then, the process returns to step S83, and the subsequent processing is repeated.

In step S91, the information-amount evaluation unit 50 calculates the number of matching frames b. The number of matching frames b is calculated by, for example, substituting the converged value $x_N$ into the information-amount evaluation value x in Equation (1) and calculating Equation (1).

In the exemplary information-amount evaluation process shown in FIG. 15, a loop determination process in the loop processing of steps S83 to S90 is performed using both the processing of step S89 and the processing of step S90. However, the present embodiment is not limited to the example shown in FIG. 15, and either processing may be performed.

Figure 17:
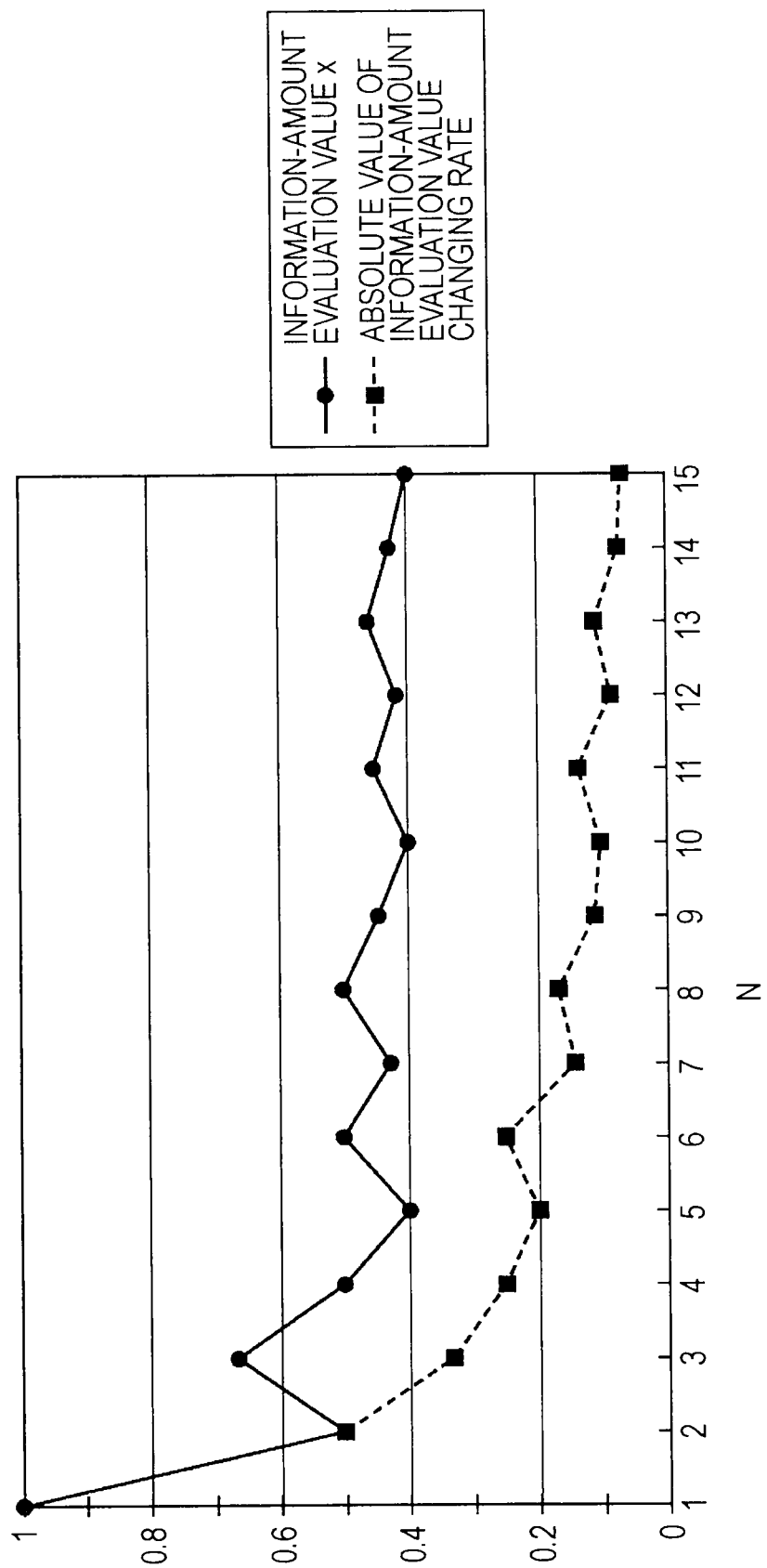
FIG. 17 is a diagram showing the convergence of an information-amount evaluation value in the information-amount evaluation process shown in FIG. 15.

FIG. 17 shows the convergence of the information-amount evaluation value x using the loop processing of steps S83 to S90 in the exemplary information-amount evaluation process shown in FIG. 15. In FIG. 17, in 2-3 pull-down video, as the value N increases, the information-amount evaluation value $x_N$ changes.

In FIG. 17, a feature value pattern is "AABBBCCDDDE-EFFF...". For example, if a threshold value $X_{threshold}$ of the changing rate from the information-amount evaluation value $x_{N-1}$ is set to 0.1, the convergence condition is met when N=10. Thus, the number of matching frames b is calculated according to Equation (1) using x10=0.4. Specifically, as given in Equation (3) below, the number of matching frames b, which is equal to 10, is determined:

$$b = \min(\lceil 4/0.4 \rceil, 32) = 10 \quad (3)$$

Figure 18:
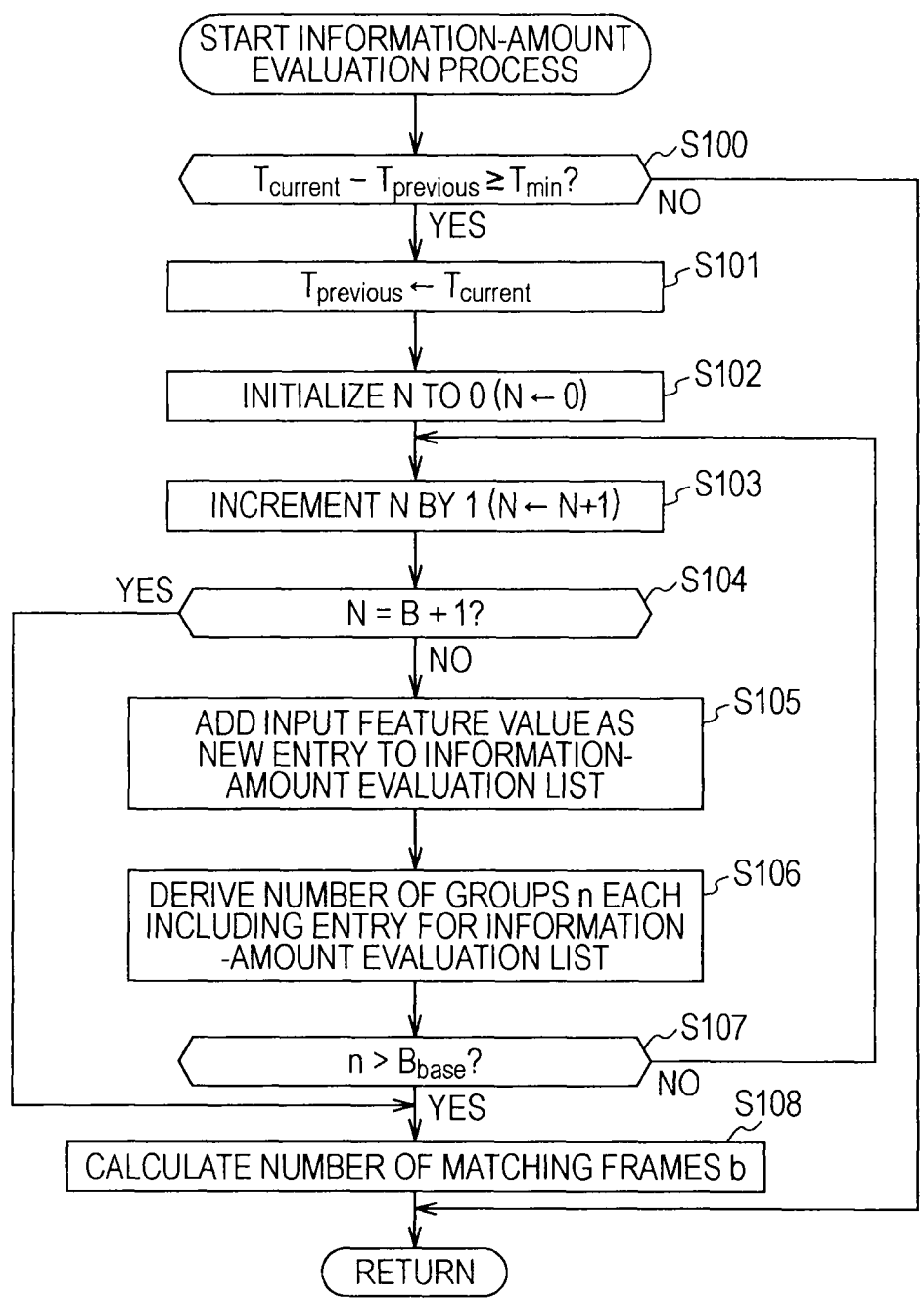
FIG. 18 is a flowchart showing a second example of the information-amount evaluation process in the synchronization detection process shown in FIG. 12.

FIG. 18 shows an example of an information-amount evaluation process using an information-amount evaluation list, which is an example of a simple version of the exemplary process shown in FIG. 15. Here, also, the number of matching frames b is used as a final output value.

Since the processing of steps S100 to S103 is basically similar to the processing of steps S80 to S83 shown in FIG. 15, the description thereof is omitted.

In step S104, the information-amount evaluation unit 50 determines whether or not N=B+1, where B is the same value as B in Equation (1). If N=B+1, a positive determination is obtained in step S104, and the process proceeds to step S108. On the other hand, if the value N is not equal to the value given by B+1, a negative determination is obtained in step S104, and the process proceeds to step S105.

In step S105, the information-amount evaluation unit 50 adds the input feature value as a new entry to the information-amount evaluation list.

In step S106, the information-amount evaluation unit 50 derives the number of groups n each including an entry for the information-amount evaluation list.

In step S107, the information-amount evaluation unit 50 determines whether or not $n > B_{base}$. If the number of groups n each including an entry for the information-amount evaluation list does not exceed a predetermined value $B_{base}$, a negative determination is obtained in step S107. Then, the process returns to step S103, and the subsequent processing is repeated. In other words, the loop processing of steps S103 to S107 is repeatedly executed until the number of groups n each including an entry for the information-amount evaluation list exceeds the predetermined value $B_{base}$.

When the number of groups n each including an entry for the information-amount evaluation list exceeds the predetermined value $B_{base}$, a positive determination is obtained in step S107, and the process proceeds to step S108. Here, the maximum value that meets $n = B_{base}$ is N−1.

In step S108, the information-amount evaluation unit 50 calculates the number of matching frames b. In this case, the number of matching frames b is calculated by b=N−1.

Specifically, for example, FIG. 19 shows an example of the relationship between the number of frames N for which feature values have been obtained, a feature value, and the number of groups n each including an entry for an information-amount evaluation list in a case where the input video is 2-3 pull-down video. In the example shown in FIG. 19, if $B_{base} = 4$, then N=11 when $n > B_{base}$. In this case, therefore, the number of matching frames b is determined by b=N−1=11−1=10.

In this manner, if the density of information in the time direction is not extremely high, the exemplary information-amount evaluation process shown in FIG. 18, which is a simple version of the exemplary process shown in FIG. 15, can be adopted by minimally increasing the value N.

Here, it is assumed that, for example, a feature value pattern is "ABCDEEEEFGHIJJJJ...". In this case, if the addition to the information-amount evaluation list starts at time point A, N=5 when n=5. Thus, b=4. However, if the first E is set as the start time point, then N=8 when n=5. Thus, b=7.

In this manner, if the density of information in the time direction is extremely high and the start time point of the addition to the information-amount evaluation list has a large effect on the increase of the value n, the calculated value b is largely variable. In this case, therefore, the exemplary process shown in FIG. 15 is more preferably used as an information-amount evaluation process than the exemplary process shown in FIG. 18.

Information-amount evaluation processes using an information-amount evaluation list have been described by way of example. An example specific to pull-down video will now be described.

Figure 20:
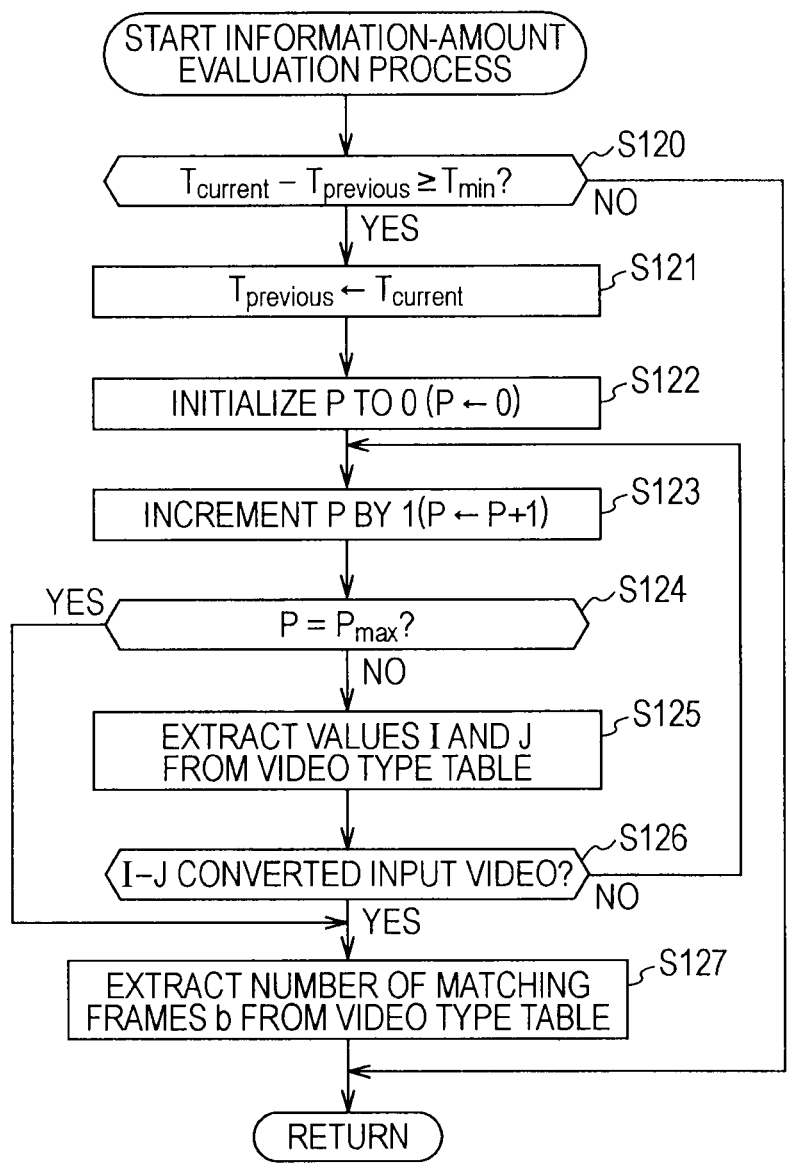
FIG. 20 is a flowchart showing a third example of the information-amount evaluation process in the synchronization detection process shown in FIG. 12.

FIG. 20 shows an example of an information-amount evaluation process specific to pull-down video. Here, the number of matching frames b is used as a final output value.

In step S120, the information-amount evaluation unit 50 determines whether or not $T_{current} - T_{previous} \geq T_{min}$.

Specifically, if the time elapsed from the previous process start time $T_{previous}$ to the current time $T_{current}$ (the current time $T_{current}$ minus the previous process time $T_{previous}$) does not exceed a predetermined time $T_{min}$, a negative determination is obtained in step S120, and the information-amount evaluation process ends.

If the time elapsed from the previous process start time $T_{previous}$ to the current time $T_{current}$ (the current time $T_{current}$ minus the previous process time $T_{previous}$) exceeds the predetermined time $T_{min}$, a positive determination is obtained in step S120. Then, the process proceeds to step S121.

In step S121, the information-amount evaluation unit 50 sets the process start time $T_{previous}$ to the current time $T_{current}$.

Figures 21A, 21B:
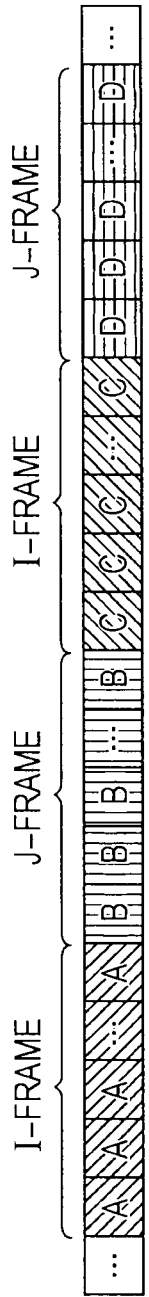
FIGS. 21A and 21B are diagrams showing a video type table used in the information-amount evaluation process shown in FIG. 20.

In step S122, the information-amount evaluation unit 50 initializes a video type number P to 0. For example, the information-amount evaluation unit 50 may have a table shown in FIG. 21A (hereinafter referred to as a "video type table"). The video type table has entries (rows) each containing a video type number P, values I and J for I-J conversion, and the number of matching frames b. The I-J conversion has a structure shown in FIG. 21B, and may be implemented by $24p$-to-$60p$ conversion, slow motion, or the like. The I-J conversion is used in various frame rate conversion processes or video edition processes. The video type number P in the video type table is initialized to 0 using the processing of step S122. In other words, at this time, none of the entries (rows) in the video type table is used as a process target, and video type number P is reset.

In step S123, the information-amount evaluation unit 50 increments the video type number P in the video type table by 1 (P←P+1). In the video type table shown in FIG. 21A, the entries (rows) to be processed are managed using the video type numbers P. Thus, the processing of step S123 means the switching of the process target to the entry (row) below the current one. In the video type table shown in FIG. 21A, process targets are sequentially set, starting from the top entry.

In step S124, the information-amount evaluation unit 50 determines whether or not $P=P_{max}$.

If the video type number P has reached the number $P_{max}$ in the last entry in the video type table, a positive determination is obtained in step S124, and the process proceeds to step S127. In step S127, the information-amount evaluation unit 50 extracts the value representing the number of matching frames b with respect to the video type number P from the video type table. The last entry (the row for the video type number $P_{max}$) contains the default number of matching frames b (in the example shown in FIG. 21A, b=4), which is not applicable to any of the conversions in the range of P=1 to $P=P_{max-1}$. In this case, the default number of matching frames b is extracted.

On the other hand, if the video type number P has not reached the video type number in the last entry in the video type table, a negative determination is obtained in step S124, and the process proceeds to step S125.

In step S125, the information-amount evaluation unit 50 extracts the values I and J with respect to the video type number P from the video type table.

In step S126, the information-amount evaluation unit 50 determines whether or not the input video is I-J converted video. For example, when P=2, the value I is 2 and the value J is 3. Thus, it is determined whether or not the synchronized feature value has pattern "AABBBCCDDD . . . ". If the input video is not I-J converted video, a negative determination is obtained in step S126. Then, the process returns to step S123, and the subsequent processing is repeated.

If the input video is I-J converted video, a positive determination is obtained in step S126, and the process proceeds to step S127. The determination process in step S126 is not limited to that in the example shown in FIG. 20, and, for example, a determination process based on an existing high-performance pull-down detection process may be adopted.

In step S127, the information-amount evaluation unit 50 extracts the value representing the number of matching frames b with respect to the video type number P from the video type table. For example, when P=2 (in the case of 2-3 pull-down video), value 10 is extracted as the number of matching frames b.

Information-amount evaluation processes using an information-amount evaluation list followed by an information-amount evaluation process specific to pull-down video have been described by way of example. Next, an information-amount evaluation process using the difference between adjacent frames will be described by way of example.

Figure 22:
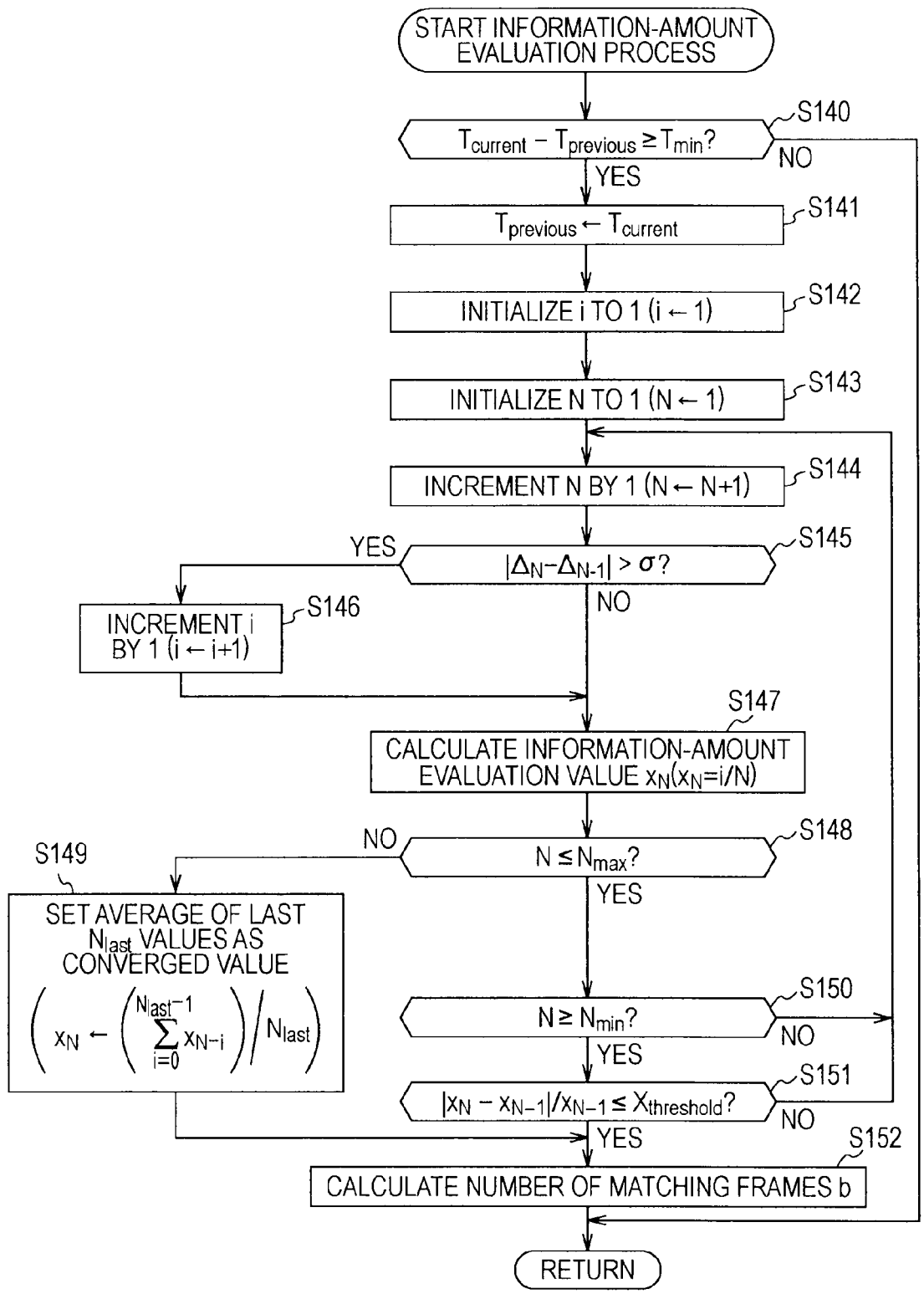
FIG. 22 is a flowchart showing a fourth example of the information-amount evaluation process in the synchronization detection process shown in FIG. 12.

FIG. 22 shows an example of an information-amount evaluation process using the difference between adjacent frames. Here, the number of matching frames b is used as a final output value.

In step S140, the information-amount evaluation unit 50 determines whether or not $T_{current}-T_{previous} \geq T_{min}$.

Specifically, if the time elapsed from the previous process start time $T_{previous}$ to the current time $T_{current}$ (the current time $T_{current}$ minus the previous process time $T_{previous}$) does not exceed a predetermined time $T_{min}$, a negative determination is obtained in step S140, and the information-amount evaluation process ends.

On the other hand, if the time elapsed from the previous process start time $T_{previous}$ to the current time $T_{current}$ (the current time $T_{current}$ minus the previous process time $T_{previous}$) exceeds the predetermined time $T_{min}$, a positive determination is obtained in step S140. Then, the process proceeds to step S141.

In step S141, the information-amount evaluation unit 50 sets the process start time $T_{previous}$ to the current time $T_{current}$.

In step S142, the information-amount evaluation unit 50 initializes the value i to 1.

In step S143, the information-amount evaluation unit 50 initializes the value N to 1.

In step S144, the information-amount evaluation unit 50 increments the value N by 1 (N←N+1).

In step S145, the information-amount evaluation unit 50 determines whether or not $|\Delta_N - \Delta_{N-1}| > \sigma$. Specifically, the information-amount evaluation unit 50 calculates the difference between feature values ($\Delta_N$ and $\Delta_{N-1}$) of adjacent frames in order to determine the similarity between the adjacent frames. If the difference is greater than a predetermined value $\sigma$, a positive determination is obtained in step S145. Then, in step S146, the value i is incremented by 1. On the other hand, if the difference is not greater than the predetermined value $\sigma$, a negative determination is obtained in step S145. Then, the process proceeds to step S147 without performing the processing of step S146.

In step S147, the information-amount evaluation unit 50 calculates an information-amount evaluation value $x_N$. Specifically, a proportion in which the difference between synchronized feature values of adjacent frames is greater than a predetermined value is calculated as the information-amount evaluation value $x_N$. Specifically, the equation $x_N=i/N$ is calculated, where $x1=1/1=1$.

Thereafter, the processing of steps S148 to S152 is executed. Since the processing of steps S148 to S152 is basically similar to the processing of steps S87 to S91 shown in FIG. 15, the description thereof is omitted.

Figure 23:
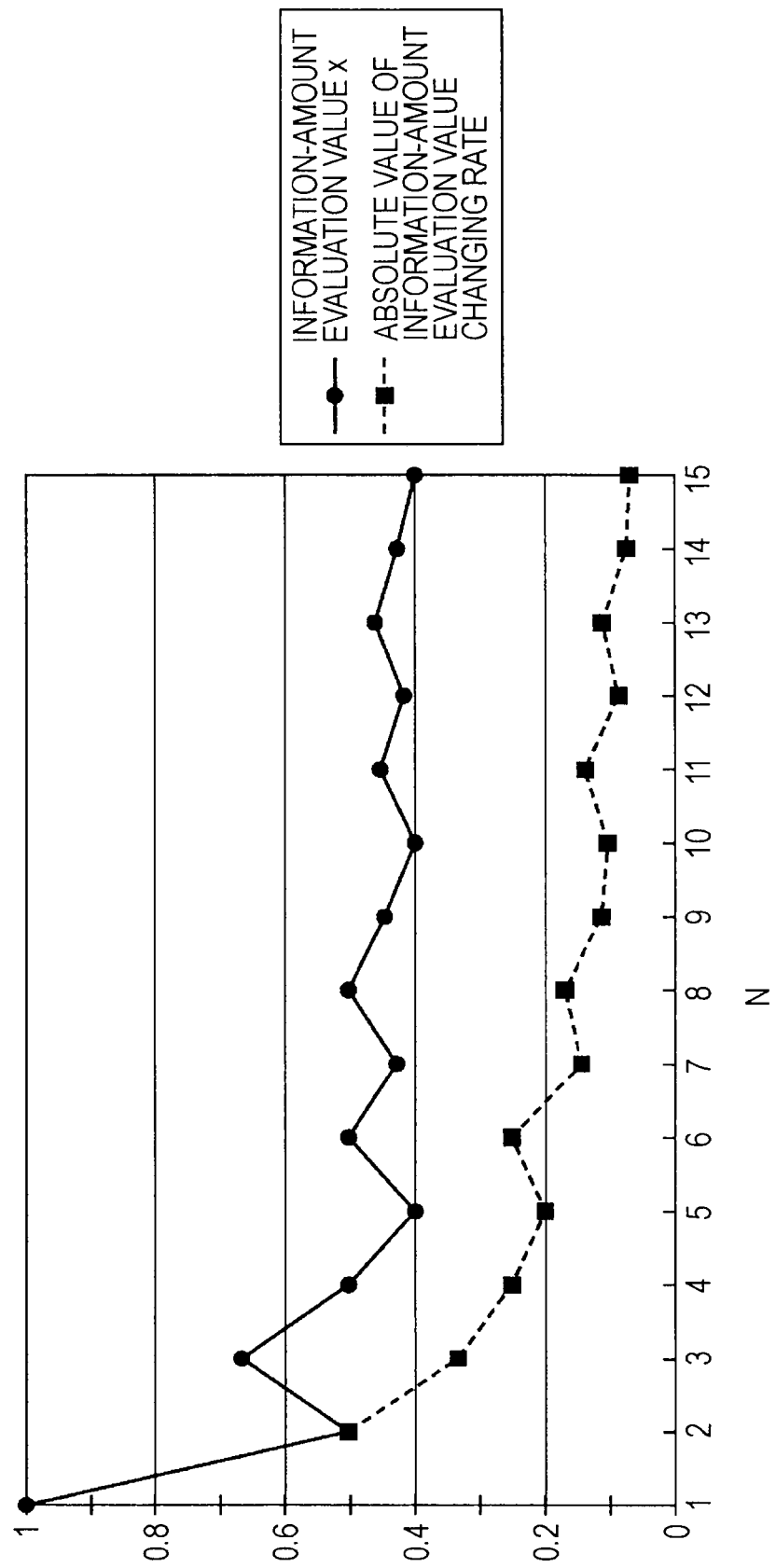
FIG. 23 is a diagram showing the convergence of an information-amount evaluation value in the information-amount evaluation process shown in FIG. 22.

FIG. 23 shows the convergence of the information-amount evaluation value x using the exemplary information-amount evaluation process shown in FIG. 22. In FIG. 23, in 2-3 pull-down video, as the value N increases, the information-amount evaluation value $x_N$ changes.

In FIG. 23, a feature value pattern is "AABBBCCDDDE-EFFF . . . ". For example, if a threshold value $X_{threshold}$ of the changing rate from the information-amount evaluation value $x_{N-1}$ is set to 0.1, the convergence condition is met when N=10. Thus, the number of matching frames b is calculated using x10=0.4.

Figure 24:
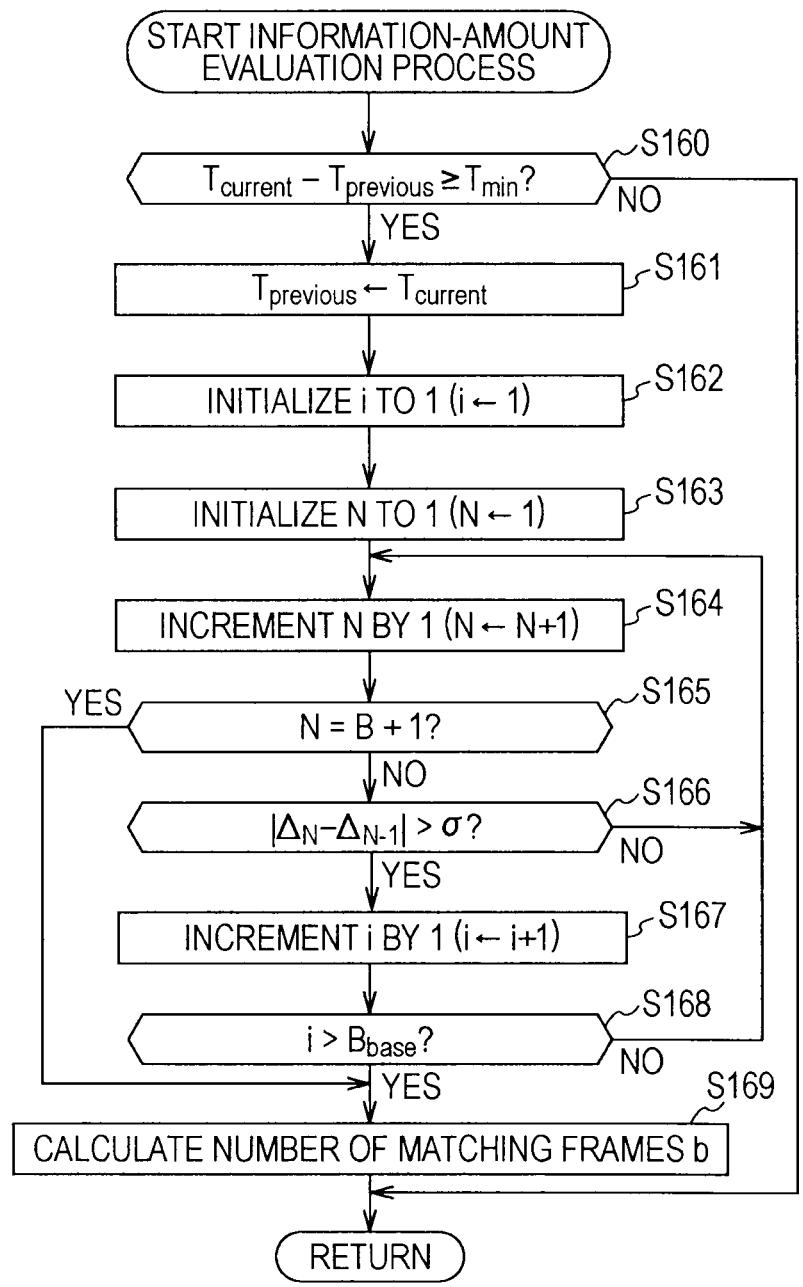
FIG. 24 is a flowchart showing a fifth example of the information-amount evaluation process in the synchronization detection process shown in FIG. 12.

FIG. 24 shows an example of an information-amount evaluation process using the difference between adjacent frames, which is an example of a simple version of the exemplary process shown in FIG. 22. Here, also, the number of matching frames b is used as a final output value.

Since the processing of steps S160 to S164 is basically similar to the processing of steps S140 to S144 shown in FIG. 22, the description thereof is omitted.

In step S165, the information-amount evaluation unit 50 determines whether or not N=B+1, where B is the same value as B in Equation (1). If N=B+1, a positive determination is obtained in step S165, and the process proceeds to step S169. On the other hand, if the value N is not equal to the value given by B+1, a negative determination is obtained in step S165, and the process proceeds to step S166.

In step S166, the information-amount evaluation unit 50 determines whether or not $|\Delta_N-\Delta_{N-1}|>\sigma$. Specifically, the information-amount evaluation unit 50 calculates the difference between feature values ($\Delta_N$ and $\Delta_{N-1}$) of adjacent frames in order to determine the similarity between the adjacent frames. If the difference is greater than a predetermined value $\sigma$, a positive determination is obtained in step S166. Then, in step S167, the value i is incremented by 1. Thus, the process proceeds to step S168. On the other hand, if the difference is not greater than the predetermined value $\sigma$, a negative determination is obtained in step S166. Then, the process returns to step S164, and the subsequent processing is repeated.

In step S168, the information-amount evaluation unit 50 determines whether or not $i>B_{base}$. If the value of the counter i obtained when the difference between synchronized feature values ($\Delta_N$ and $\Delta_{-1}$) of adjacent frames is greater than a predetermined value does not exceed a predetermined value $B_{base}$, a negative determination is obtained in step S168. Then, the process returns to step S164, and the subsequent processing is repeated. In other words, the loop processing of steps S164 to S168 is repeated until the value of the counter i exceeds the predetermined value $B_{base}$.

If the value of the counter i obtained when the difference between the synchronized feature values ($\Delta_N$ and $\Delta_{N-1}$) of the adjacent frames is greater than the predetermined value exceeds the predetermined value $B_{base}$, a positive determination is obtained in step S168, and the process proceeds to step S169. Here, the maximum value that meets $i=B_{base}$ is N-1.

In step S169, the information-amount evaluation unit 50 calculates the number of matching frames b. In this case, the number of matching frames b is calculated by b=N-1.

Figure 25:
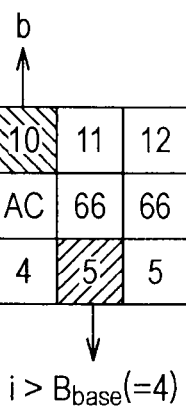
FIG. 25 is a diagram showing a process that is a part of the information-amount evaluation process shown in FIG. 24.

Specifically, for example, FIG. 25 shows an example of the relationship between the number of frames N for which feature values have been obtained, a feature value, and the value of the counter i in a case where the input video is 2-3 pull-down video. In the example shown in FIG. 25, if $B_{base}$=4, then N=11 when $i>B_{base}$. In this case, therefore, the number of matching frames b is determined by b=N-1=11-1=10.

In this manner, if the density of information in the time direction is not extremely high, the exemplary information-amount evaluation process shown in FIG. 24, which is a simple version of the exemplary process shown in FIG. 22, can be adopted by minimally increasing the value N.

Here, it is assumed that, for example, a feature value pattern is "ABCDEEEEFGHIJJJJ . . . ". In this case, if the information-amount evaluation starts at time point A, N=5 when i=5. Thus, b=4. However, if the first E is set as the start time point, then N=8 when i=5. Thus, b=7.

In this manner, if the density of information in the time direction is extremely high and the start time point of the information-amount evaluation has a large effect on the increase of the value i, the calculated value b is largely variable. In this case, therefore, the exemplary process shown in FIG. 22 is more preferably used as an information-amount evaluation process than the exemplary process shown in FIG. 24.

Information-amount evaluation processes using an information-amount evaluation list, an information-amount evaluation process specific to pull-down video, and an information-amount evaluation process using the difference between adjacent frames have been described by way of example.

The series of processes described above can be executed by hardware and software.

In this case, at least a portion of the information processing system described above may be implemented by, for example, a personal computer shown in FIG. 26.

In FIG. 26, a central processing unit (CPU) 1001 executes various processes according to a program recorded on a read only memory (ROM) 1002 or a program loaded from a storage unit 1008 onto a random access memory (RAM) 1003. The RAM 1003 also stores data necessary for the CPU 1001 to execute various processes, as desired.

The CPU 1001, the ROM 1002, and the RAM 1003 are connected to one another via a bus 1004. An input/output interface 1005 is also connected to the bus 1004.

The input/output interface 1005 is connected to an input unit 1006 including a keyboard and a mouse, an output unit 1007 including a display, the storage unit 1008, which may be implemented by a hard disk or the like, and a communication unit 1009 including a modem and a terminal adapter. The communication unit 1009 controls communication with another device (not shown) via a network including the Internet.

The input/output interface 1005 is further connected to a drive 1010, as necessary. A removable medium 1021 such as a magnetic disk, an optical disk, a magneto-optical disk, or a semiconductor memory is placed, as desired, in the drive 1010, and a computer program read from the removable medium 1021 is installed into the storage unit 1008, as necessary.

When the series of processes is executed by software, a program constituting the software is installed into a computer incorporated in dedicated hardware or a device capable of implementing various functions by installing therein various programs, such as a general-purpose personal computer, from a network or a recording medium.

A recording medium including such a program may be implemented by, as shown in FIG. 26, the removable medium (package medium) 111 having the program recorded thereon, which is distributed to provide a user with the program in a separate manner from the computer, such as a magnetic disk (including a floppy disk), an optical disk (including a compact disk-read only memory (CD-ROM) and a digital versatile disk (DVD)), a magneto-topical disk (including a Mini-Disk (MD), or a semiconductor memory. The recording medium may also be implemented by a device having the program recorded thereon, which is provided to a user in the form incorporated in advance in the computer, such as the ROM 1002 or a hard disk included in the storage unit 1008.

In this specification, steps describing a program recorded on a recording medium may include, as well as processes executed in time sequence in accordance with the order described herein, processes executed in parallel or individually, which may not necessarily be executed in time sequence.

In this specification, the term "system" refers to the entirety of an apparatus including a plurality of processing devices or processing units.

The present application contains subject matter related to that disclosed in Japanese Priority Patent Application JP 2008-166061 filed in the Japan Patent Office on Jun. 25, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
playback-position feature value extracting means for extracting a playback-position feature value from an image being played back, the playback-position feature value being a feature value at a playback position;
synchronizing means for synchronizing the playback-position feature value with a feature value on a data recording medium on which setting information for processing the image is recorded in association with a feature value of the image;
control means for controlling a time width during which the synchronizing means performs synchronization between the feature value on the data recording medium with the playback-position feature value, the control means matching feature values between the data recording medium with the playback-position feature value for a number of frames equal to the time width being greater than 1, the control means determining the number of frames based on an image type such that the synchronizing means synchronizes between the feature value on the data recording medium and the playback-position feature value over the time width equal to the number of frames which varies based on the image type;
reading means for reading, when the synchronizing means synchronizes the feature value on the data recording medium with the playback-position feature value under control of the control means, the setting information recorded on the data recording medium in association with the playback-position feature value; and
reflecting means for reflecting, based on the setting information read by the reading means, the process in the image being played back.

2. The image processing apparatus according to claim 1, wherein the control means determines the time width using a density of information included in the image in a time direction.

3. The image processing apparatus according to claim 1, wherein there are a plurality of types of images, and wherein the control means determines the time width using a table stored in advance in the image processing apparatus, the table including pieces of information each indicating, for one of the plurality of types of images, a time width during which a playback-position feature value is synchronized with a feature value on the data recording medium.

4. The image processing apparatus according to claim 1, wherein the control means determines the time width using a difference between two adjacent unit images in the image.

5. The image processing apparatus according to claim 1, wherein the control means determines the number of frames to be 10.

6. An image processing method for an image processing apparatus, comprising:
extracting a playback-position feature value from an image being played back, the playback-position feature value being a feature value at a playback position;
synchronizing the playback-position feature value with a feature value on a data recording medium on which setting information for processing the image is recorded in association with a feature value of the image;
controlling a time width during which the feature value on the data recording medium is synchronized with the playback-position feature value, the controlling including matching feature values between the data recording medium with the playback-position feature value for a number of frames and determining the number of frames equal to the time width being greater than 1 and based on an image type such that the synchronizing synchronizes between the feature value on the data recording medium and the playback-position feature value over the time width equal to the number of frames which varies based on the image type;
reading, when the feature value on the data recording medium is synchronized with the playback-position feature value under controlling of the time width, the setting information recorded on the data recording medium in association with the playback-position feature value; and
reflecting, based on the read setting information, the process in the image being played back.

7. A non-transitory computer readable medium encoded with a program for causing a computer to execute a control process comprising:
extracting a playback-position feature value from an image being played back, the playback-position feature value being a feature value at a playback position;
synchronizing the playback-position feature value with a feature value on a data recording medium on which setting information for processing the image is recorded in association with a feature value of the image;
controlling a time width during which the feature value on the data recording medium is synchronized with the playback-position feature value, the controlling including matching feature values between the data recording medium with the playback-position feature value for a number of frames equal to the time width being greater than 1 and determining the number of frames based on an image type such that the synchronizing synchronizes between the feature value on the data recording medium and the playback-position feature value over the time width equal to the number of frames which varies based on the image type;
reading, when the feature value on the data recording medium is synchronized with the playback-position feature value under controlling of the time width, the setting information recorded on the data recording medium in association with the playback-position feature value; and
reflecting, based on the read setting information, the process in the image being played back.

8. An image processing apparatus comprising:
a playback-position feature value extracting unit configured to extract a playback-position feature value from an image being played back, the playback-position feature value being a feature value at a playback position;
a synchronizing unit configured to synchronize the playback-position feature value with a feature value on a data recording medium on which setting information for processing the image is recorded in association with a feature value of the image;
a control unit configured to control a time width during which the synchronizing unit performs synchronization between the feature value on the data recording medium with the playback-position feature value, the control unit configured to match feature values between the data recording medium with the playback-position feature value for a number of frames equal to the time width being greater than 1, the control unit configured to determine the number of frames based on an image type such that the synchronizing unit is configured to synchronize between the feature value on the data recording medium and the playback-position feature value over the time width equal to the number of frames which varies based on the image type;

a reading unit configured to read, when the synchronizing unit synchronizes the feature value on the data recording medium with the playback-position feature value under control of the control unit, the setting information recorded on the data recording medium in association with the playback-position feature value; and a reflecting unit configured to reflect, based on the setting information read by the reading unit, the process in the image being played back.

* * * * *